(12) United States Patent
Trude et al.

(10) Patent No.: US 10,118,331 B2
(45) Date of Patent: Nov. 6, 2018

(54) SYSTEM AND METHOD FOR FORMING A CONTAINER HAVING A GRIP REGION

(75) Inventors: Gregory Trude, Seven Valleys, PA (US); Paul Kelley, Wrightsville, PA (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 0 days.

(21) Appl. No.: 12/856,516

(22) Filed: Aug. 13, 2010

(65) Prior Publication Data

US 2010/0301058 A1    Dec. 2, 2010

Related U.S. Application Data

(63) Continuation of application No. 11/399,430, filed on Apr. 7, 2006, now Pat. No. 8,017,065.

(51) Int. Cl.
*B65D 6/00* (2006.01)
*B29C 49/48* (2006.01)
(Continued)

(52) U.S. Cl.
CPC .......... *B29C 49/4802* (2013.01); *B29C 49/54* (2013.01); *B65D 23/102* (2013.01);
(Continued)

(58) Field of Classification Search
CPC ..... B29C 49/4802; B29C 49/54; B29C 49/06; B29C 49/22; B65D 23/102;
(Continued)

(56) References Cited

U.S. PATENT DOCUMENTS

D1,665 S      10/1862   Robinson
1,499,239 A    6/1924   Malmquist
(Continued)

FOREIGN PATENT DOCUMENTS

AU    2002257159 B2    4/2003
CA       2077717 A1    3/1993
(Continued)

OTHER PUBLICATIONS

The file wrapper and contents of U.S. Appl. No. 60/220,326, filed Jul. 24, 2000 dated Oct. 29, 2008.
(Continued)

*Primary Examiner* — J. Gregory Pickett
*Assistant Examiner* — Elizabeth Volz
(74) *Attorney, Agent, or Firm* — Baker Botts L.L.P.

(57) ABSTRACT

A container forming assembly and method includes receiving a parison within a cavity of a mold, enclosing the parison within the mold having a wall with a recess, inflating the parison in the mold to form a blow molded container where the blow molded container has a sidewall, a movable region formed at the recess, and a hinge circumscribing an interface between the sidewall and the movable region, and moving the movable region toward an interior of the blow molded container about the hinge before filling. Furthermore, a method for forming a container includes receiving a parison, enclosing the parison with a mold that includes a cavity, and inflating the parison in said mold to form a blow molded container with a moveable region at the cavity. The method further includes repositioning the moveable region before filling the blow molded container.

17 Claims, 22 Drawing Sheets

(51) Int. Cl.
  B29C 49/54 (2006.01)
  B65D 23/10 (2006.01)
  *B29C 49/06* (2006.01)
  *B29C 49/22* (2006.01)
  *B29K 23/00* (2006.01)
  *B29K 67/00* (2006.01)
  *B29K 77/00* (2006.01)
  *B29L 31/46* (2006.01)
  *B29L 31/00* (2006.01)

(52) U.S. Cl.
  CPC ............... *B29B 2911/1402* (2013.01); *B29B 2911/1404* (2013.01); *B29B 2911/14026* (2013.01); *B29B 2911/14033* (2013.01); *B29C 49/06* (2013.01); *B29C 49/22* (2013.01); *B29K 2023/06* (2013.01); *B29K 2023/065* (2013.01); *B29K 2023/0633* (2013.01); *B29K 2023/086* (2013.01); *B29K 2067/00* (2013.01); *B29K 2077/00* (2013.01); *B29L 2031/463* (2013.01); *B29L 2031/7158* (2013.01)

(58) Field of Classification Search
  CPC ... B29B 2911/1402; B29B 2911/14026; B29B 2911/14033; B29B 2911/1404; B29K 2023/06; B29K 2023/0633; B29K 2023/065; B29K 2023/086; B29K 2067/00; B29K 2077/00; B29L 2031/463; B29L 2031/7158
  USPC ....... 220/4.13, 660, 606, 608, 609; 215/371, 215/373, 374, 375; 206/509, 524.6; 425/522
  See application file for complete search history.

(56) References Cited

U.S. PATENT DOCUMENTS

| | | |
|---|---|---|
| 2,142,257 A | 1/1937 | Saeta |
| 110,624 A | 7/1938 | Mekeel, Jr. |
| 2,124,959 A | 7/1938 | Vogel |
| 2,378,324 A | 6/1945 | Ray et al. |
| 2,880,902 A | 4/1959 | Owsen |
| 2,960,248 A | 11/1960 | Kuhlman |
| 2,971,671 A | 2/1961 | Shakman |
| 2,982,440 A | 5/1961 | Harrison |
| D192,535 S | 4/1962 | Laudano |
| 3,043,461 A | 7/1962 | Glassco |
| 3,081,002 A | 3/1963 | Tauschinski et al. |
| 3,090,478 A | 5/1963 | Stanley |
| 3,142,371 A | 7/1964 | Rice et al. |
| 3,174,655 A | 3/1965 | Hurschman |
| 3,198,861 A | 8/1965 | Marvel |
| 3,201,111 A | 8/1965 | Afton |
| 3,301,293 A | 1/1967 | Santelli |
| 3,325,031 A | 6/1967 | Singier |
| 3,397,724 A | 8/1968 | Bolen et al. |
| 3,409,167 A | 11/1968 | Blanchard |
| 3,417,893 A | 12/1968 | Lieberman |
| 3,426,939 A | 2/1969 | Young |
| 3,441,982 A | 5/1969 | Tsukahara et al. |
| 3,468,443 A | 9/1969 | Marcus |
| 3,483,908 A | 12/1969 | Donovan |
| 3,485,355 A | 12/1969 | Stewart |
| D217,439 S | 5/1970 | Platte |
| D219,366 S | 12/1970 | Lewis, Jr. et al. |
| 3,693,828 A | 9/1972 | Kneusel et al. |
| 3,704,140 A | 11/1972 | Petit et al. |
| 3,727,783 A | 4/1973 | Carmichael |
| 3,791,508 A | 2/1974 | Osborne et al. |
| D231,904 S | 6/1974 | Boden |
| 3,819,789 A | 6/1974 | Parker |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor, Jr. |
| 3,942,673 A | 3/1976 | Lyu et al. |
| 3,949,033 A | 4/1976 | Uhlig |
| 3,956,441 A | 5/1976 | Uhlig |
| 4,035,455 A | 7/1977 | Rosenkranz et al. |
| 4,036,926 A | 7/1977 | Chang |
| 4,037,752 A | 7/1977 | Dulmaine et al. |
| 4,117,062 A | 9/1978 | Uhlig |
| 4,123,217 A | 10/1978 | Fischer et al. |
| 4,125,632 A | 11/1978 | Vosti et al. |
| 4,134,510 A | 1/1979 | Chang |
| 4,158,624 A | 6/1979 | Ford et al. |
| 4,170,622 A | 10/1979 | Uhlig |
| 4,174,782 A | 11/1979 | Obsomer |
| 4,177,239 A | 12/1979 | Gittner et al. |
| 4,219,137 A | 8/1980 | Hutchens |
| 4,231,483 A | 11/1980 | Dechenne et al. |
| 4,247,012 A | 1/1981 | Alberghini |
| D258,117 S | 2/1981 | Bashour |
| 4,301,933 A | 11/1981 | Yoshino et al. |
| D262,267 S | 12/1981 | Cox |
| 4,318,489 A | 3/1982 | Snyder et al. |
| 4,318,882 A | 3/1982 | Agrawal et al. |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Przytulla et al. |
| 4,381,061 A * | 4/1983 | Cerny et al. ............... 220/62.11 |
| D269,158 S | 5/1983 | Gaunt et al. |
| 4,386,701 A | 6/1983 | Galer |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,495,974 A | 1/1985 | Pohorski |
| D277,551 S | 2/1985 | Kerr |
| 4,497,621 A | 2/1985 | Kudert et al. |
| 4,497,855 A | 2/1985 | Agrawal et al. |
| 4,525,401 A | 6/1985 | Pocock et al. |
| 4,542,029 A | 9/1985 | Caner et al. |
| 4,547,333 A | 10/1985 | Takada |
| 4,585,158 A | 4/1986 | Wardlaw, III |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A * | 5/1987 | McHenry et al. ............... 53/425 |
| 4,684,025 A | 8/1987 | Copland et al. |
| 4,685,273 A | 8/1987 | Caner et al. |
| D292,378 S | 10/1987 | Brandt et al. |
| 4,701,121 A | 10/1987 | Jakobsen et al. |
| 4,723,661 A | 2/1988 | Hoppmann et al. |
| 4,724,855 A | 2/1988 | Jackson |
| 4,725,464 A | 2/1988 | Collette |
| 4,747,507 A | 5/1988 | Fitzgerald et al. |
| 4,749,092 A | 6/1988 | Sugiura et al. |
| 4,769,206 A | 9/1988 | Reymann et al. |
| 4,773,458 A | 9/1988 | Touzani |
| 4,785,949 A | 11/1988 | Krishnakumar et al. |
| 4,785,950 A | 11/1988 | Miller et al. |
| 4,804,097 A | 2/1989 | Alberghini et al. |
| 4,807,424 A | 2/1989 | Robinson et al. |
| 4,813,556 A | 3/1989 | Lawrence |
| 4,831,050 A | 5/1989 | Cassidy et al. |
| 4,836,398 A | 6/1989 | Leftault, Jr. et al. |
| 4,836,698 A | 6/1989 | Takagi et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,890,752 A | 1/1990 | Ota et al. |
| 4,892,205 A | 1/1990 | Powers et al. |
| 4,896,205 A | 1/1990 | Weber |
| 4,921,147 A | 5/1990 | Poirier |
| 4,927,679 A | 5/1990 | Beck |

(56) References Cited

U.S. PATENT DOCUMENTS

| | | |
|---|---|---|
| 4,962,863 A | 10/1990 | Wendling et al. |
| 4,967,538 A | 11/1990 | Leftault, Jr. et al. |
| 4,978,015 A | 12/1990 | Walker |
| 4,993,565 A | 2/1991 | Ota et al. |
| 4,997,692 A | 3/1991 | Yoshino |
| 5,004,109 A | 4/1991 | Bartley et al. |
| 5,005,716 A | 4/1991 | Eberle |
| 5,014,868 A | 5/1991 | Wittig et al. |
| 5,020,691 A | 6/1991 | Nye |
| 5,024,340 A | 6/1991 | Alberghini et al. |
| 5,033,254 A | 7/1991 | Zenger |
| 5,054,632 A | 10/1991 | Alberghini et al. |
| 5,060,453 A | 10/1991 | Alberghini et al. |
| 5,064,081 A | 11/1991 | Hayashi et al. |
| 5,067,622 A | 11/1991 | Garver et al. |
| 5,090,180 A | 2/1992 | Sorensen |
| 5,092,474 A | 3/1992 | Leigner |
| 5,122,327 A | 6/1992 | Spina et al. |
| 5,133,468 A | 7/1992 | Brunson et al. |
| 5,141,120 A | 8/1992 | Brown et al. |
| 5,141,121 A | 8/1992 | Brown et al. |
| 5,148,930 A | 9/1992 | Ota et al. |
| 5,165,557 A | 11/1992 | Ota et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood |
| 5,217,737 A | 6/1993 | Gygax et al. |
| 5,222,615 A | 6/1993 | Ota et al. |
| 5,224,614 A | 7/1993 | Bono et al. |
| 5,226,550 A | 7/1993 | Mikolaitis et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,543 A | 11/1993 | Ugarelli |
| 5,261,544 A | 11/1993 | Weaver, Jr. |
| 5,279,433 A | 1/1994 | Krishnakumar et al. |
| 5,281,387 A | 1/1994 | Collette et al. |
| 5,303,834 A | 4/1994 | Krishnakumar et al. |
| 5,310,043 A | 5/1994 | Alcorn |
| 5,333,761 A | 8/1994 | Davis et al. |
| 5,337,909 A | 8/1994 | Vailliencourt |
| 5,337,924 A | 8/1994 | Dickie |
| 5,341,946 A | 8/1994 | Vailliencourt et al. |
| 5,381,910 A | 1/1995 | Sugiura et al. |
| 5,385,250 A | 1/1995 | Pasquale |
| 5,389,332 A | 2/1995 | Amari et al. |
| 5,392,937 A | 2/1995 | Prevot et al. |
| 5,405,015 A | 4/1995 | Bhatia et al. |
| 5,407,086 A | 4/1995 | Ota et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| D366,831 S | 2/1996 | Semersky et al. |
| 5,492,245 A | 2/1996 | Kalbanis |
| 5,503,283 A | 4/1996 | Semersky |
| 5,543,107 A | 8/1996 | Malik et al. |
| 5,579,937 A | 12/1996 | Valyi |
| 5,593,063 A | 1/1997 | Claydon et al. |
| 5,598,941 A | 2/1997 | Semersky et al. |
| 5,632,397 A | 5/1997 | Fandeux et al. |
| 5,637,167 A | 6/1997 | Krishnakumar et al. |
| 5,642,826 A | 7/1997 | Melrose |
| D382,807 S | 8/1997 | Silvers et al. |
| 5,672,730 A | 9/1997 | Cottman |
| 5,687,874 A | 11/1997 | Omori et al. |
| 5,690,244 A | 11/1997 | Darr |
| 5,697,489 A | 12/1997 | Deonarine et al. |
| 5,704,504 A | 1/1998 | Bueno |
| D390,114 S | 2/1998 | Young |
| 5,713,480 A | 2/1998 | Petre et al. |
| 5,718,030 A | 2/1998 | Langmack et al. |
| D391,854 S | 3/1998 | Ankney et al. |
| 5,730,314 A | 3/1998 | Wiemann et al. |
| 5,730,914 A | 3/1998 | Ruppman, Sr. |
| 5,735,420 A | 4/1998 | Nakamaki et al. |
| 5,737,827 A | 4/1998 | Kuse et al. |
| 5,758,790 A | 6/1998 | Ewing, Jr. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,833,115 A | 11/1998 | Eiten |
| D402,896 S | 12/1998 | Conrad |
| 5,860,556 A | 1/1999 | Robbins, III |
| 5,868,272 A | 2/1999 | Deal |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D413,519 S | 9/1999 | Eberle et al. |
| D415,030 S | 10/1999 | Searle et al. |
| 5,971,184 A | 10/1999 | Krishnakumar et al. |
| 5,976,653 A | 11/1999 | Collette et al. |
| 5,979,696 A | 11/1999 | Bode et al. |
| 5,989,661 A | 11/1999 | Krishnakumar et al. |
| 6,016,932 A | 1/2000 | Gaydosh et al. |
| RE36,639 E | 4/2000 | Okhai |
| 6,045,001 A | 4/2000 | Seul |
| 6,051,295 A | 4/2000 | Schloss et al. |
| 6,063,325 A | 5/2000 | Nahill et al. |
| 6,065,624 A | 5/2000 | Steinke |
| 6,068,110 A | 5/2000 | Kumakiri et al. |
| 6,074,596 A | 6/2000 | Jacquet |
| 6,077,554 A | 6/2000 | Wiemann et al. |
| 6,090,334 A | 7/2000 | Matsuno et al. |
| 6,105,815 A | 8/2000 | Mazda |
| 6,113,377 A | 9/2000 | Clark |
| D431,470 S | 10/2000 | Henderson |
| D433,946 S | 11/2000 | Rollend et al. |
| 6,164,474 A | 12/2000 | Cheng et al. |
| 6,176,382 B1 | 1/2001 | Bazlur Rashid |
| D440,877 S | 4/2001 | Lichtman et al. |
| 6,209,710 B1 | 4/2001 | Mueller et al. |
| 6,213,325 B1 | 4/2001 | Cheng et al. |
| 6,217,818 B1 | 4/2001 | Collette et al. |
| 6,228,317 B1 | 5/2001 | Smith et al. |
| 6,230,912 B1 | 5/2001 | Rashid |
| 6,248,413 B1 | 6/2001 | Barel et al. |
| 6,253,809 B1 | 7/2001 | Paradies |
| 6,273,282 B1 | 8/2001 | Ogg et al. |
| 6,277,321 B1 | 8/2001 | Vailliencourt et al. |
| D449,538 S | 10/2001 | Burleson et al. |
| 6,298,638 B1 | 10/2001 | Bettle |
| D450,595 S | 11/2001 | Ogg et al. |
| 6,349,839 B1 | 2/2002 | Mooney |
| 6,354,427 B1 | 3/2002 | Pickel et al. |
| 6,375,025 B1 | 4/2002 | Mooney |
| 6,390,316 B1 | 5/2002 | Mooney |
| 6,398,052 B1 | 6/2002 | Cheng et al. |
| 6,413,466 B1 | 7/2002 | Boyd et al. |
| 6,439,413 B1 | 8/2002 | Prevot et al. |
| 6,460,714 B1 | 10/2002 | Silvers et al. |
| 6,467,639 B2 | 10/2002 | Mooney |
| 6,485,669 B1 | 11/2002 | Boyd et al. |
| 6,494,333 B2 | 12/2002 | Sasaki et al. |
| 6,502,369 B1 | 1/2003 | Andison et al. |
| 6,514,451 B1 | 2/2003 | Boyd et al. |
| 6,585,123 B1 | 7/2003 | Pedmo et al. |
| 6,585,124 B1 | 7/2003 | Boyd et al. |
| 6,595,380 B2 | 7/2003 | Silvers |
| 6,612,451 B2 | 9/2003 | Tobias et al. |
| 6,616,001 B2 | 9/2003 | Saito et al. |
| 6,635,217 B1 | 10/2003 | Britton |
| D482,976 S | 12/2003 | Melrose |
| 6,659,300 B2 | 12/2003 | Wurster et al. |
| 6,662,960 B2 | 12/2003 | Hong et al. |

(56) References Cited

U.S. PATENT DOCUMENTS

| | | |
|---|---|---|
| 6,676,883 B2 | 1/2004 | Hutchinson et al. |
| 6,698,606 B2 | 3/2004 | Deubel et al. |
| 6,739,467 B2 | 5/2004 | Saito et al. |
| D492,201 S | 6/2004 | Pritchett et al. |
| 6,749,075 B2 | 6/2004 | Bourque et al. |
| 6,749,780 B2 | 6/2004 | Tobias |
| 6,763,968 B1 | 7/2004 | Boyd et al. |
| 6,763,969 B1 | 7/2004 | Melrose et al. |
| 6,769,561 B2 | 8/2004 | Futral et al. |
| 6,779,673 B2 | 8/2004 | Melrose et al. |
| 6,796,450 B2 | 9/2004 | Prevot et al. |
| 6,814,248 B2 | 11/2004 | Beck et al. |
| 6,841,262 B1 | 1/2005 | Beck et al. |
| 6,920,992 B2 | 7/2005 | Lane et al. |
| D508,410 S | 8/2005 | Zboch et al. |
| 6,923,334 B2 | 8/2005 | Melrose et al. |
| 6,929,138 B2 | 8/2005 | Melrose et al. |
| 6,932,230 B2 | 8/2005 | Pedmo et al. |
| D509,984 S | 9/2005 | Zboch et al. |
| 6,942,116 B2 | 9/2005 | Lisch et al. |
| 6,964,347 B2 | 11/2005 | Miura |
| 6,974,047 B2 | 12/2005 | Kelley et al. |
| 6,983,858 B2 | 1/2006 | Slat et al. |
| 7,051,073 B1 | 5/2006 | Dutta |
| 7,051,889 B2 | 5/2006 | Boukobza |
| D522,368 S | 6/2006 | Darr et al. |
| 7,073,675 B2 | 7/2006 | Trude |
| 7,077,279 B2 | 7/2006 | Melrose |
| 7,080,746 B2 | 7/2006 | Saito et al. |
| 7,080,747 B2 | 7/2006 | Lane et al. |
| 7,080,748 B2 | 7/2006 | Sasaki et al. |
| 7,097,059 B2 | 8/2006 | Saito et al. |
| 7,097,060 B2 | 8/2006 | Penny et al. |
| 7,097,061 B2 | 8/2006 | Simpson, Jr. et al. |
| 7,118,002 B2 | 10/2006 | Saito et al. |
| D531,910 S | 11/2006 | Melrose |
| 7,137,520 B1 | 11/2006 | Melrose |
| 7,140,505 B2 | 11/2006 | Roubal et al. |
| 7,150,372 B2 | 12/2006 | Lisch et al. |
| D535,884 S | 1/2007 | Davis et al. |
| 7,159,374 B2 | 1/2007 | Abercrombie, III et al. |
| D538,168 S | 3/2007 | Davis et al. |
| 7,191,910 B2 | 3/2007 | Deemer et al. |
| D547,664 S | 7/2007 | Davis et al. |
| 7,159,729 B2 | 9/2007 | Sabold et al. |
| 7,296,703 B2 | 11/2007 | Lane |
| 7,334,695 B2 | 2/2008 | Bysick et al. |
| 7,347,339 B2 | 3/2008 | Bangi et al. |
| 7,350,657 B2 | 4/2008 | Eaton et al. |
| D572,599 S | 7/2008 | Melrose |
| 7,416,088 B2 * | 8/2008 | Boukobza ............ B65D 1/0276 215/371 |
| 7,416,089 B2 | 8/2008 | Kraft et al. |
| D576,041 S | 9/2008 | Melrose et al. |
| 7,451,886 B2 | 11/2008 | Lisch et al. |
| 7,481,325 B2 | 1/2009 | Simpson, Jr. et al. |
| 7,543,713 B2 | 6/2009 | Trude et al. |
| 7,552,834 B2 | 6/2009 | Tanaka et al. |
| 7,574,846 B2 | 8/2009 | Sheets et al. |
| 7,694,842 B2 | 4/2010 | Melrose |
| 7,726,106 B2 | 6/2010 | Kelley et al. |
| 7,735,304 B2 | 6/2010 | Kelley et al. |
| 7,748,551 B2 | 7/2010 | Gatewood et al. |
| D623,952 S | 9/2010 | Yourist et al. |
| 7,799,264 B2 | 9/2010 | Trude |
| 7,882,971 B2 | 2/2011 | Kelley et al. |
| 7,900,425 B2 | 3/2011 | Bysick et al. |
| 7,926,243 B2 | 4/2011 | Kelley et al. |
| D637,495 S | 5/2011 | Gill et al. |
| D637,913 S | 5/2011 | Schlies et al. |
| D641,244 S | 7/2011 | Bysick et al. |
| 7,980,404 B2 | 7/2011 | Trude et al. |
| 8,011,166 B2 | 9/2011 | Sheets et al. |
| 8,017,065 B2 | 9/2011 | Trude et al. |
| D646,966 S | 10/2011 | Gill et al. |
| 8,028,498 B2 | 10/2011 | Melrose |
| 8,075,833 B2 | 12/2011 | Kelley |
| D653,119 S | 1/2012 | Hunter et al. |
| 8,096,098 B2 | 1/2012 | Kelley et al. |
| D653,550 S | 2/2012 | Hunter |
| D653,957 S | 2/2012 | Yourist et al. |
| 8,162,655 B2 | 4/2012 | Trude et al. |
| 8,171,701 B2 | 5/2012 | Kelley et al. |
| 8,235,704 B2 | 8/2012 | Kelley |
| 8,323,555 B2 | 12/2012 | Trude et al. |
| 8,747,727 B2 | 6/2014 | Trude et al. |
| 8,794,462 B2 | 8/2014 | Trude |
| 8,919,587 B2 | 12/2014 | Howell et al. |
| 9,707,711 B2 | 7/2017 | Trude et al. |
| 2001/0035391 A | 1/2001 | Young et al. |
| 2001/0030167 A1 | 10/2001 | Mooney |
| 2002/0063105 A1 * | 5/2002 | Darr et al. .................... 215/373 |
| 2002/0074336 A1 | 6/2002 | Silvers |
| 2002/0096486 A1 | 7/2002 | Bourque et al. |
| 2002/0153343 A1 | 10/2002 | Tobias et al. |
| 2002/0158038 A1 | 10/2002 | Heisel et al. |
| 2002/0162819 A1 | 11/2002 | Saito et al. |
| 2003/0015491 A1 | 1/2003 | Melrose et al. |
| 2003/0075521 A1 | 4/2003 | Miura |
| 2003/0186006 A1 | 10/2003 | Schmidt et al. |
| 2003/0196926 A1 | 10/2003 | Tobias et al. |
| 2003/0205550 A1 | 11/2003 | Prevot et al. |
| 2003/0217947 A1 | 11/2003 | Ishikawa et al. |
| 2004/0000533 A1 | 1/2004 | Kamineni et al. |
| 2004/0016716 A1 | 1/2004 | Melrose et al. |
| 2004/0026357 A1 | 2/2004 | Beck et al. |
| 2004/0074864 A1 | 4/2004 | Melrose et al. |
| 2004/0129669 A1 | 7/2004 | Kelley et al. |
| 2004/0149677 A1 | 8/2004 | Slat et al. |
| 2004/0173565 A1 | 9/2004 | Semersky et al. |
| 2004/0211746 A1 | 10/2004 | Trude |
| 2004/0232103 A1 | 11/2004 | Lisch et al. |
| 2005/0035083 A1 | 2/2005 | Pedmo et al. |
| 2005/0035084 A1 | 2/2005 | Simpson, Jr. et al. |
| 2005/0121408 A1 | 6/2005 | Deemer et al. |
| 2005/0121409 A1 | 6/2005 | Penny et al. |
| 2005/0211662 A1 | 9/2005 | Eaton et al. |
| 2005/0218107 A1 | 10/2005 | Sabold et al. |
| 2005/0218108 A1 | 10/2005 | Bangi et al. |
| 2005/0247664 A1 | 11/2005 | Lane et al. |
| 2005/0252881 A1 | 11/2005 | Zhang et al. |
| 2006/0006133 A1 * | 1/2006 | Lisch .................. B65D 79/005 215/374 |
| 2006/0051541 A1 | 3/2006 | Steele |
| 2006/0138074 A1 * | 6/2006 | Melrose ............... B65D 1/0276 215/373 |
| 2006/0147664 A1 | 7/2006 | Richards et al. |
| 2006/0151425 A1 | 7/2006 | Kelley et al. |
| 2006/0231985 A1 | 10/2006 | Kelley |
| 2006/0243698 A1 | 11/2006 | Melrose |
| 2006/0249477 A1 | 11/2006 | Simpson, Jr. et al. |
| 2006/0255005 A1 | 11/2006 | Melrose et al. |
| 2006/0261031 A1 | 11/2006 | Melrose |
| 2007/0017892 A1 | 1/2007 | Melrose |
| 2007/0045222 A1 | 3/2007 | Denner et al. |
| 2007/0045223 A1 | 3/2007 | Noll et al. |
| 2007/0045312 A1 | 3/2007 | Abercrombie, III et al. |
| 2007/0051073 A1 | 3/2007 | Kelley et al. |
| 2007/0084821 A1 | 4/2007 | Bysick et al. |
| 2007/0125742 A1 | 6/2007 | Simpson, Jr. et al. |
| 2007/0125743 A1 | 6/2007 | Pritchett, Jr. et al. |
| 2007/0131644 A1 | 6/2007 | Melrose |
| 2007/0181403 A1 | 8/2007 | Sheets et al. |
| 2007/0187355 A1 | 8/2007 | Kamineni |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0029475 A1 | 2/2008 | Scarola |
| 2008/0047964 A1 | 2/2008 | Denner et al. |
| 2008/0087628 A1 | 4/2008 | Bangi et al. |
| 2008/0156847 A1 | 7/2008 | Hawk et al. |
| 2008/0257856 A1 | 10/2008 | Melrose et al. |
| 2009/0090728 A1 | 4/2009 | Trude et al. |

(56) References Cited

U.S. PATENT DOCUMENTS

| | | | |
|---|---|---|---|
| 2009/0091067 A1 | 4/2009 | Trude et al. |
| 2009/0092720 A1 | 4/2009 | Trude et al. |
| 2009/0120530 A1 | 5/2009 | Kelley et al. |
| 2009/0134117 A1 | 5/2009 | Mooney |
| 2009/0202766 A1 | 8/2009 | Beuerle et al. |
| 2009/0239436 A1 | 12/2009 | Miyazaki et al. |
| 2010/0018838 A1 | 1/2010 | Kelley et al. |
| 2010/0133228 A1 | 6/2010 | Trude |
| 2010/0116778 A1 | 7/2010 | Melrose |
| 2010/0163513 A1 | 7/2010 | Pedmo |
| 2010/0170199 A1 | 7/2010 | Kelley et al. |
| 2010/0213204 A1 | 8/2010 | Melrose |
| 2010/0237083 A1 | 9/2010 | Trude et al. |
| 2010/0301057 A1 | 12/2010 | Trude et al. |
| 2010/0301058 A1 | 12/2010 | Trude et al. |
| 2011/0049083 A1 | 3/2011 | Scott et al. |
| 2011/0049084 A1 | 3/2011 | Yourist et al. |
| 2011/0084046 A1 | 4/2011 | Schlies et al. |
| 2011/0094618 A1 | 4/2011 | Melrose |
| 2011/0108515 A1 | 5/2011 | Gill et al. |
| 2011/0113731 A1 | 5/2011 | Bysick et al. |
| 2011/0132865 A1 | 6/2011 | Hunter et al. |
| 2011/0147392 A1 | 6/2011 | Trude et al. |
| 2011/0210133 A1 | 9/2011 | Melrose et al. |
| 2011/0266293 A1 | 11/2011 | Kelley et al. |
| 2011/0284493 A1 | 11/2011 | Yourist et al. |
| 2012/0104010 A1 | 5/2012 | Kelley |
| 2012/0107541 A1 | 5/2012 | Nahill et al. |
| 2012/0132611 A1 | 5/2012 | Trude et al. |
| 2012/0152964 A1 | 6/2012 | Kelley et al. |
| 2012/0240515 A1 | 9/2012 | Kelley et al. |
| 2012/0266565 A1 | 10/2012 | Trude et al. |
| 2012/0267381 A1 | 10/2012 | Trude et al. |
| 2013/0000259 A1 | 1/2013 | Trude et al. |

FOREIGN PATENT DOCUMENTS

| | | | |
|---|---|---|---|
| DE | 1761753 | | 1/1972 |
| DE | P2102319.8 | | 8/1972 |
| DE | 3215866 | A1 | 11/1983 |
| EP | 225 155 | A2 | 6/1987 |
| EP | 225155 | A2 | 6/1987 |
| EP | 346518 | A1 | 12/1989 |
| EP | 0 502 391 | A2 | 9/1992 |
| EP | 0 505 054 | A1 | 9/1992 |
| EP | 0521642 | A1 | 1/1993 |
| EP | 0 551 788 | A1 | 7/1993 |
| EP | 0666222 | A1 | 2/1994 |
| EP | 0 739 703 | | 10/1996 |
| EP | 0 609 348 | B1 | 2/1997 |
| EP | 0916406 | | 5/1999 |
| EP | 0957030 | A2 | 11/1999 |
| EP | 1 063 076 | A1 | 12/2000 |
| EP | 1063076 | * | 12/2000 ............. B29C 49/06 |
| FR | 1571499 | | 6/1969 |
| FR | 2607109 | | 5/1988 |
| GB | 781103 | | 8/1957 |
| GB | 1113988 | | 5/1968 |
| GB | 2050919 | A | 1/1981 |
| GB | 2372977 | A | 9/2002 |
| JP | S40-15909 | | 6/1940 |
| JP | 48-31050 | | 9/1973 |
| JP | 49-28628 | | 7/1974 |
| JP | 54-72181 | A | 6/1979 |
| JP | S54-70185 | | 6/1979 |
| JP | 35656830 | A | 5/1981 |
| JP | S56-62911 | | 5/1981 |
| JP | 56-72730 | U | 6/1981 |
| JP | 57-210829 | A | 1/1982 |
| JP | S57-17730 | | 1/1982 |
| JP | 57-37827 | | 2/1982 |
| JP | 57-37827 | U | 2/1982 |
| JP | 57-126310 | | 8/1982 |
| JP | 58-055005 | | 4/1983 |
| JP | 61-192539 | A | 8/1986 |
| JP | 63-189224 | A | 8/1988 |
| JP | 64-004662 | | 2/1989 |
| JP | 3-43342 | | 2/1991 |
| JP | 3-43342 | A | 2/1991 |
| JP | 03-076625 | | 4/1991 |
| JP | 4-10012 | | 1/1992 |
| JP | 5-193694 | | 8/1993 |
| JP | 53-10239 | A | 11/1993 |
| JP | H05-81009 | | 11/1993 |
| JP | 06-270235 | A | 9/1994 |
| JP | 6-336238 | A | 12/1994 |
| JP | 07-300121 | A | 11/1995 |
| JP | H08-048322 | | 2/1996 |
| JP | 08-244747 | A | 9/1996 |
| JP | 8-253220 | A | 10/1996 |
| JP | 8-282633 | A | 10/1996 |
| JP | 09-039934 | A | 2/1997 |
| JP | 9-110045 | A | 4/1997 |
| JP | 09039934 | A | 10/1997 |
| JP | 10-167226 | A | 6/1998 |
| JP | 10-181734 | A | 7/1998 |
| JP | 10-230919 | A | 9/1998 |
| JP | 3056271 | | 11/1998 |
| JP | 11-218537 | A | 8/1999 |
| JP | 2000-229615 | A | 8/2000 |
| JP | 2002-127237 | A | 5/2002 |
| JP | 2002-160717 | A | 6/2002 |
| JP | 2002-326618 | A | 11/2002 |
| JP | 2003-095238 | | 4/2003 |
| JP | 2004-026307 | A | 1/2004 |
| JP | 2006-501109 | | 1/2006 |
| JP | 2007-216981 | A | 8/2007 |
| JP | 2008-189721 | A | 8/2008 |
| JP | 2009-001639 | A | 1/2009 |
| NZ | 240448 | | 6/1995 |
| NZ | 296014 | | 10/1998 |
| NZ | 335565 | | 10/1999 |
| NZ | 506684 | | 9/2001 |
| NZ | 512423 | | 9/2001 |
| NZ | 521694 | | 10/2003 |
| WO | WO 93/09031 | A1 | 5/1993 |
| WO | WO 93/12975 | A1 | 7/1993 |
| WO | WO 94/05555 | | 3/1994 |
| WO | WO 94/06617 | | 3/1994 |
| WO | WO 97/03885 | | 2/1997 |
| WO | WO 97/14617 | | 4/1997 |
| WO | WO 97/34808 | | 9/1997 |
| WO | WO 97/34808 | A1 | 9/1997 |
| WO | WO 99/21770 | | 5/1999 |
| WO | WO 00/38902 | A1 | 7/2000 |
| WO | WO 00/51895 | A1 | 9/2000 |
| WO | WO 01/12531 | A1 | 2/2001 |
| WO | WO 01/40081 | A1 | 6/2001 |
| WO | WO 01/74689 | A1 | 10/2001 |
| WO | WO 02/02418 | A1 | 1/2002 |
| WO | WO 02/18213 | A1 | 3/2002 |
| WO | WO 02/085755 | | 10/2002 |
| WO | WO 2004/028910 | A1 | 4/2004 |
| WO | WO 2004/106176 | A2 | 9/2004 |
| WO | WO 2004/106175 | A1 | 12/2004 |
| WO | WO 2005/012091 | A2 | 2/2005 |
| WO | WO 2005/025999 | A1 | 3/2005 |
| WO | WO 2005/087628 | | 9/2005 |
| WO | WO 2006/113428 | A3 | 10/2006 |
| WO | WO 2007/047574 | A1 | 4/2007 |
| WO | WO 2007/127337 | A2 | 11/2007 |
| WO | WO 2010/058098 | A2 | 5/2010 |

OTHER PUBLICATIONS

Final Office Action for U.S. Appl. No. 10/558,284 dated Sep. 9, 2008.
Office Action for U.S. Appl. No. 10/558,284 dated Jan. 25, 2008.
Office Action for U.S. Appl. No. 10/851,083 dated Nov. 28, 2008.
Final Office Action for U.S. Appl. No. 10/851,083 dated Jun. 12, 2008.
Office Action for U.S. Appl. No. 10/851,083 dated Sep. 6, 2007.

(56) References Cited

OTHER PUBLICATIONS

International Search Report for PCT/US2005/008374 dated Aug. 2, 2005.
IPRP (including Written Opinion) for PCT/US2005/008374 dated Sep. 13, 2006.
International Search Report for PCT/US2004/016405 dated Feb. 15, 2005.
IPRP (including Written Opinion) for PCT/US2004/016405 dated Nov. 25, 2005.
Office Action for Application No. EP 06 750 165.0-2307 dated Nov. 24, 2008.
International Search Report for PCT/US2006/040361 dated Feb. 26, 2007.
IPRP (including Written Opinion) for PCT/US2006/040361 dated Apr. 16, 2008.
International Search Report for PCT/US2007/006318 dated Sep. 11, 2007.
IPRP (including Written Opinion) PCT/US2007/006318 dated Sep. 16, 2008.
IPRP (including Written Opinion) PCT/US2006/014055 dated Oct. 16, 2007.
International Search Report for PCT/US2004/024581 dated Jul. 25, 2005.
IPRP (including Written Opinion) for PCT/US2004/024581 dated Jan. 30, 2006.
Official Notification for counterpart Japanese Application No. 2006-522084 dated May 19, 2009.
Examination Report for counterpart New Zealand Application No. 545528 dated Jul. 1, 2008.
Examination Report for counterpart New Zealand Application No. 569422 dated Jul. 1, 2008.
Examination Report for New Zealand Application No. 550336 dated Mar. 26, 2009.
Examination Report for counterpart New Zealand Application No. 545528 dated Sep. 20, 2007.
Examination Report for counterpart New Zealand Application No. 569422 dated Sep. 29, 2009.
Office Action for U.S. Appl. No. 11/249,342 dated Jun. 10, 2009.
Office Action for U.S. Appl. No. 11/249,342 dated Jan. 12, 2010.
Office Action for Chinese Application No. 2006800380748 dated Jul. 10, 2009.
Examiner's Report for Australian Application No. 2006236674 dated Sep. 18, 2009.
Examiner's Report for Australian Application No. 2006236674 dated Nov. 6, 2009.
Office Action for Chinese Application No. 200680012360.7 dated Jul. 10, 2009.
Examination Report for New Zealand Application No. 563134 dated Aug. 3, 2009.
Office Action for U.S. Appl. No. 11/375,040 dated Dec. 1, 2009.
Office Action for European Application No. 07752979.0-2307 dated Aug. 21, 2009.
Final Office Action for U.S. Appl. No. 10/566,294 dated Sep. 10, 2009.
Office Action for U.S. Appl. No. 10/566,294 dated Apr. 21, 2009.
Final Office Action for U.S. Appl. No. 10/566,294 dated Feb. 13, 2009.
Office Action for U.S. Appl. No. 10/566,294 dated Oct. 27, 2008.
"Application and Development of PET Plastic Bottle," Publication of Tsinghad Tongfang Optical Disc Co. Ltd., Issue 4, 2000, p. 41. (No English language translation available).
International Search Report for PCT/US2006/014055 dated Dec. 7, 2006.
International Search Report and Written Opinion dated Mar. 15, 2010 for PCT/US2010/020045.
International Search Report and Written Opinion dated Sep. 8, 2009 for PCT/US2009/051023.
Chanda, M. & Roy, Salil K., Plastics Technology Handbook, 2007, CRC Press, pp. 2-24-2-37.

Office Action dated Feb. 3, 2010 for Canadian Application No. 2,604,231.
Communication dated Mar. 9, 2010 for European Application No. 09 173 607.4 enclosing European search report and European search opinion dated Feb. 25, 2010.
Office Action dated Oct. 26, 2010, U.S. Appl. No. 11/362,416.
Final Office Action dated May 7, 2010, U.S. Appl. No. 11/362,416.
Office Action dated Oct. 2, 2009, U.S. Appl. No. 11/362,416.
Office Action dated Feb. 2, 2011, U.S. Appl. No. 11/399,430.
Office Action dated Aug. 5, 2010, U.S. Appl. No. 11/399,430.
Final Office Action dated Feb. 22, 2010, U.S. Appl. No. 11/399,430.
Office Action dated Sep. 4, 2009, U.S. Appl. No. 11/399,430.
Office Action dated Jun. 16, 2009, U.S. Appl. No. 11/399,430.
European Search Report for EPA 10185697.9 dated Mar. 21, 2011.
U.S. Appl. No. 13/210,350, filed Aug. 15, 2011, Wurster et al.
U.S. Appl. No. 13/251,966, filed Oct. 3, 2011, Howell et al.
U.S. Appl. No. 13/210,358, filed Aug. 15, 2011, Wurster et al.
U.S. Appl. No. 13/410,902, filed Mar. 2, 2012, Gill.
International Search report dated Apr. 21, 2010 from corresponding PCT/US2009/066191 filed Dec. 1, 2009.
International Preliminary Report on Patentability and Written Opinion dated Jun. 14, 2011 for PCT/US2009/066191. 7 pages.
Office Action, Japanese Application No. 2008-506738 dated Aug. 23, 2011.
Extended European Search Report for EPA 10185697.9 dated Jul. 6, 2011.
Patent Abstracts of Japan, vol. 012, No. 464; Dec. 6, 1988.
Patent Abstracts of Japan, vol. 2002, No. 09, Sep. 4, 2002.
Patent Abstracts of Japan, vol. 015, No. 239, Jun. 20, 1991.
Examination Report dated Jul. 25, 2012, in New Zealand Patent Application No. 593486.
Taiwanese Office Action dated Jun. 10, 2012, Application No. 095113450.
Japanese First Notice of Reasons for Rejection dated Aug. 23, 2011, in Application No. 2008-506738.
Japanese Second Notice of Reasons for Rejection dated Jun. 11, 2012, in Application No. 2008-506738.
Office Action dated Aug. 14, 2012, in Japanese Patent Application No. 2008-535769.
Examiner's Report dated Feb. 15, 2011 in Australian Application No. AU200630483.
Office Action dated Oct. 31, 2011, in Australian Patent Application No. 2011203263.
Office Action dated Jul. 19, 2011, in Japanese Patent Application No. 2008-535769.
Office Action dated Dec. 6, 2011, in Japanese Patent Application No. 2008-535769.
International Search Report and Written Opinion for PCT/US2012/050251 dated Nov. 16, 2012.
International Search Report and Written Opinion for PCT/US2012/050256 dated Dec. 6, 2012.
Requisition dated Feb. 3, 2010 for Canadian Application No. 2,604,231.
Requisition dated Jan. 9, 2013 for Canadian Application No. 2,559,319.
Office Action dated Feb. 5, 2013, in Mexican Patent Application No. MX/a/2008/004703.
Office Action dated Jul. 26, 2010 for Canadian Application No. 2,527,001.
Australian Office Action dated Mar. 3, 2011 in Application No. 2010246525.
Australian Office Action dated Nov. 8, 2011, in Application No. 2011205106.
Examiner Report dated May 26, 2010, in Australian Application No. 2004261654.
Examiner Report dated Jul. 23, 2010, in Australian Application No. 2004261654.
Requisition dated May 25, 2010 for Canadian Application No. 2,534,266.
Communication dated Jun. 16, 2006, for European Application No. 04779595.0.
Final Official Notification dated Mar. 23, 2010 for Japanese Application No. 2006-522084.

(56) References Cited

OTHER PUBLICATIONS

International Search Report and Written Opinion dated Dec. 18, 2012, in PCT/US12/056330.
U.S. Appl. No. 13/251,966, Sep. 19, 2014 Notice of Allowance.
U.S. Appl. No. 11/399,430, filed Apr. 7, 2006.
U.S. Appl. No. 12/627,922, filed Nov. 30, 2009.
U.S. Appl. No. 12/697,371, filed Feb. 1, 2010.
U.S. Appl. No. 12/856,484, filed Aug. 13, 2010.
U.S. Appl. No. 13/251,966, filed Oct. 3, 2011.
U.S. Appl. No. 13/453,981, filed Apr. 23, 2012.
U.S. Appl. No. 13/453,993, filed Apr. 23, 2012.
U.S. Appl. No. 11/399,430, filed Jul. 27, 2011 Issue Fee Payment.
U.S. Appl. No. 11/399,430, filed Jul. 11, 2011 Notice of Allowance.
U.S. Appl. No. 11/399,430, filed May 2, 2011 Response to Non-Final Office Action.
U.S. Appl. No. 11/399,430, filed Feb. 2, 2011 Non-Final Office Action.
U.S. Appl. No. 11/399,430, filed Dec. 2, 2010 Response to Non-Final Office Action.
U.S. Appl. No. 11/399,430, filed Aug. 5, 2010 Non-Final Office Action.
U.S. Appl. No. 11/399,430, filed May 24, 2010 Amendment and Request for Continued Examination (RCE).
U.S. Appl. No. 11/399,430, filed Feb. 22, 2010 Final Office Action.
U.S. Appl. No. 11/399,430, filed Dec. 4, 2009 Response to Non-Final Office Action.
U.S. Appl. No. 11/399,430, filed Sep. 4, 2009 Non-Final Office Action.
U.S. Appl. No. 11/399,430, Jul. 8, 2009 Response to Restriction Requirement.
U.S. Appl. No. 11/399,430 Jun. 19, 2009 Restriction Requirement.
U.S. Appl. No. 12/627,922, filed Mar. 21, 2012 Issue Fee Payment.
U.S. Appl. No. 12/627,922, filed Dec. 21, 2011 Notice of Allowance.
U.S. Appl. No. 12/627,922, filed Dec. 2, 2011 Response to Non-Final Office Action.
U.S. Appl. No. 12/627,922, filed Sep. 2, 2011 Non-Final Office Action.
U.S. Appl. No. 12/627,922, filed Jul. 26, 2011 Response to Restriction Requirement.
U.S. Appl. No. 12/627,922, filed Jul. 5, 2011 Restriction Requirement.
U.S. Appl. No. 12/697,371, filed Jun. 30, 2014 Issue Fee Payment.
U.S. Appl. No. 12/697,371, filed Jun. 17, 2014 Notice of Allowance.
U.S. Appl. No. 12/697,371, filed Apr. 25, 2014 Notice of Allowance.
U.S. Appl. No. 12/697,371, filed Mar. 18, 2014 Amendment and Request for Continued Examination (RCE).
U.S. Appl. No. 12/697,371, filed Feb. 3, 2014 Advisory Action.
U.S. Appl. No. 12/697,371, filed Feb. 3, 2014 Applicant Initiated Interview Summary.
U.S. Appl. No. 12/697,371, filed Dec. 18, 2013 Response after Final Action.
U.S. Appl. No. 12/697,371, filed Oct. 18, 2013 Final Office Action.
U.S. Appl. No. 12/697,371, filed Aug. 2, 2013 Response to Non-Final Office Action.
U.S. Appl. No. 12/697,371, filed May 2, 2013 Non-Final Office Action.
U.S. Appl. No. 12/697,371, filed Mar. 29, 2012 Request for Continued Examination (Rce).
U.S. Appl. No. 12/697,371, filed Mar. 12, 2012 Advisory Action.
U.S. Appl. No. 12/697,371, filed Feb. 29, 2012 Amendment and Request for Continued Examination (RCE).
U.S. Appl. No. 12/697,371, filed Dec. 30, 2011 Final Office Action.
U.S. Appl. No. 12/697,371, filed Oct. 10, 2011 Response to Non-Final Office Action.
U.S. Appl. No. 12/697,371, filed Jun. 10, 2011 Non-Final Office Action.
U.S. Appl. No. 12/697,371, filed Mar. 23, 2011 Response to Non-Final Office Action.
U.S. Appl. No. 12/697,371, filed Dec. 23, 2010 Non-Final Office Action.
U.S. Appl. No. 12/856,484, filed Nov. 2, 2012 Issue Fee Payment.
U.S. Appl. No. 12/856,484, filed Aug. 2, 2012 Notice of Allowance.
U.S. Appl. No. 12/856,484, filed Jul. 17, 2012 Response after Final Action.
U.S. Appl. No. 12/856,484, filed Jun. 15, 2012 Final Office Action.
U.S. Appl. No. 12/856,484, filed Apr. 16, 2012 Response to Non-Final Office Action.
U.S. Appl. No. 12/856,484, filed Feb. 6, 2012 Non-Final Office Action.
U.S. Appl. No. 13/251,966, filed Nov. 19, 2014 Issue Fee Payment.
U.S. Appl. No. 13/251,966, filed Sep. 19, 2014 Notice of Allowance.
U.S. Appl. No. 13/251,966, filed Jun. 13, 2014 Response to Non-Final Office Action.
U.S. Appl. No. 13/251,966, filed Mar. 17, 2014 Non-Final Office Action.
U.S. Appl. No. 13/251,966, filed Nov. 25, 2013 Response to Restriction Requirement.
U.S. Appl. No. 13/251,966, filed Sep. 13, 2013 Response to Restriction Requirement.
U.S. Appl. No. 13/251,966, filed Aug. 14, 2013 Restriction Requirement.
U.S. Appl. No. 13/453,981, filed Apr. 28, 2014 Issue Fee Payment.
U.S. Appl. No. 13/453,981, filed Jan. 27, 2014 Notice of Allowance.
U.S. Appl. No. 13/453,981, filed Dec. 30, 2013 Response after Final Action.
U.S. Appl. No. 13/453,981, filed Oct. 30, 2013 Final Office Action.
U.S. Appl. No. 13/453,981, filed Sep. 13, 2013 Response to Non-Final Office Action.
U.S. Appl. No. 13/453,981, filed Jun. 13, 2013 Non-Final Office Action.
U.S. Appl. No. 13/453,993, filed Jun. 13, 2017 Issue Fee Payment.
U.S. Appl. No. 13/453,993, filed Mar. 13, 2017 Notice of Allowance.
U.S. Appl. No. 13/453,993, filed Feb. 28, 2017 Response after Final Action.
U.S. Appl. No. 13/453,993, filed Dec. 1, 2016 Final Office Action.
U.S. Appl. No. 13/453,993, filed Aug. 25, 2016 Response to Non-Final Office Action.
U.S. Appl. No. 13/453,993, filed May 25, 2016 Non-Final Office Action.
U.S. Appl. No. 13/453,993, filed Aug. 8, 2014 Response to Non-Final Office Action.
U.S. Appl. No. 13/453,993, filed May 8, 2014 Non-Final Office Action.
U.S. Appl. No. 13/453,993, filed Apr. 15, 2013 Response to Restriction Requirement.
U.S. Appl. No. 13/453,993, filed Mar. 25, 2013 Restriction Requirement.

* cited by examiner

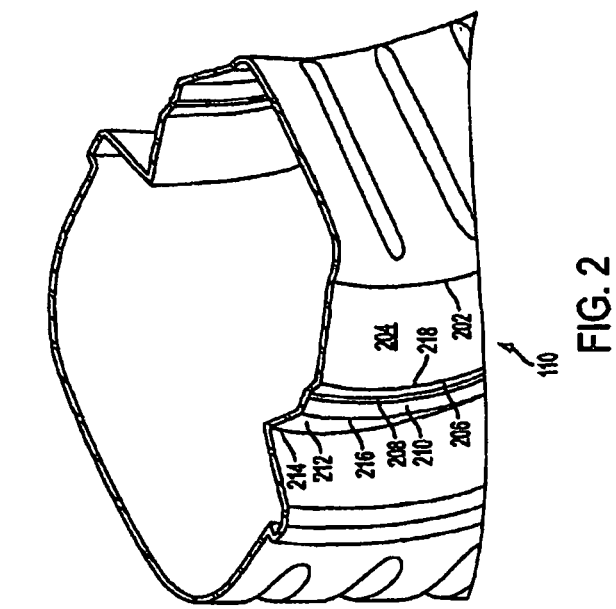
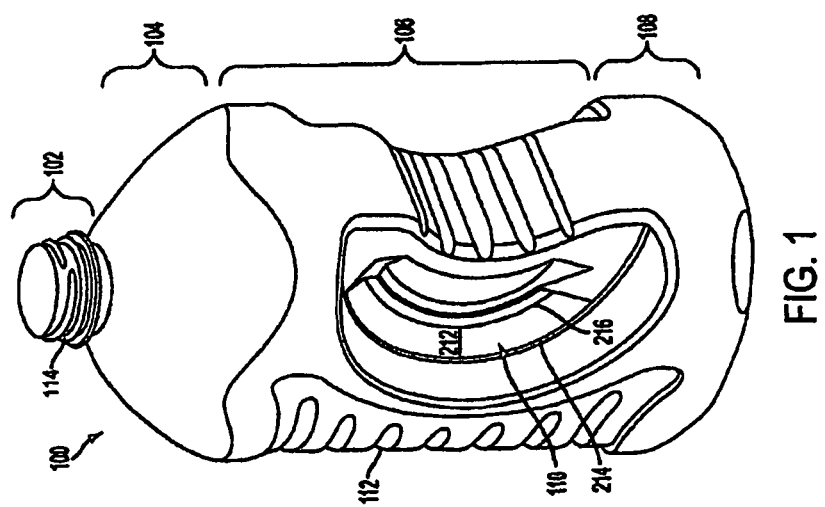

SYSTEM AND METHOD FOR FORMING A CONTAINER HAVING A GRIP REGION

CROSS-REFERENCE TO RELATED APPLICATION

This application is a continuation of application Ser. No. 11/399,430 filed Apr. 7, 2006, the subject matter of which is hereby incorporated by reference in its entirety.

BACKGROUND OF THE INVENTION

Field of the Invention

The invention generally relates to a method for blow molding a container, and more particularly to a method for blow molding a container to be formed with deep-set grips so that the formed container has secure grippability along with a good ergonomic feel. The present invention also relates generally to forming a blow molded container, and more particularly to a method for forming a blow molded container that increases orientation of material at a region of the blow molded container.

Related Art

One method of manufacturing containers is through a process known as stretch blow molding. In this process, a preformed parison, or preform, is prepared from a thermoplastic material, typically by an injection molding process. The preform typically includes a threaded end, which becomes the threads of the container. During stretch blow molding, the preform is positioned between two open blow mold halves. The blow mold halves close about the preform and cooperate to provide a cavity into which the preform is blown to form the container. Once the mold is closed, a gas is forced into the perform causing it to stretch and to take the shape of the mold as the plastic contacts the mold. After molding, the mold halves open to release the blow molded container.

One problem with stretch blow molding is that stretching of the plastic material may affect the performance of the container at certain areas. While the stretching of the plastic material may not cause problems for most sections of the container, it particularly affects the ability of the plastic material to form around a deep protrusion in the mold. In some applications of container manufacturing, a deep protrusion may be required to form a particular section of a container. For example, the particular sections of the container formed by an inset or deep protrusion may include the dome, sidewalls, and the base of the container. As the plastic contacts the deep protrusion of the mold, the plastic must stretch and flow around the protrusion into a recess. However, the plastic material is less able to flow and stretch around the protrusion because, of the contact friction with the mold surface. Insufficient material distribution at a region, such as at the base, may affect the ability of the region to maintain its shape around the protrusion during hot filling, the strength of the region, or the ability of the container to stand on a flat surface.

A lack of definition in the base caused by the inability of the plastic to properly form at a deep protrusion is a particular problem. While this is a particular problem in the base region, similar problems exist in other regions of a container where an inset is positioned. As stated previously, these other regions formed with an inset or deep protrusion include the dome, the sidewalls, etc. of a container. These problems can exist with any forming process, such as blow molding, where material must flow around a protrusion of a mold to form an inset region of a container. This is particularly true for blow molding processes including stretch blow molding, extrusion blow molding and injection blow molding.

Some containers have deep-set grips on either side of the bottle so that a consumer can easily pick up the filled container with a firm grasp of his/her hand. When blowing deep-set grips with known blow molding processes, plastic material becomes trapped in the grip regions consequently starving other regions of the container of material. To account for this, the container weight is increased as more material is required to be used to ensure that a sufficient amount of material is provided for all parts of the container. Alternatively, design compromises are made so that the resultant thinner regions are closer to the axis of the container causing those regions to be blown with more material. However, blowing heavier-containers and the resultant design constraints do not solve the problem described above.

What is needed is an improved method of forming a container with a deep-set protrusion (e.g., in the base and/or as a grip) that overcomes the shortcomings of conventional solutions that introduce additional costs, molding time, and complexity into the mold setup.

Furthermore, conventionally, a container may be manufactured through a process known as blow molding. In blow molding, a parison is received at a blow molding apparatus, and the parison is enclosed by a container mold. The blow molding apparatus inflates the parison by forcing gas into the parison which causes the parison to stretch and take the shape of the container mold. Once the parison has taken the shape of the container mold, the blow molding step is complete and the container is removed from the container mold for further processing.

In some applications of container manufacturing, a deep protrusion may be required at a particular section of a container, most often at a base or at a hand grip of the container. Deep protrusions, when located at the base of the container, are sometimes referred to as "push-ups" since the protrusions push up into the interior of the container. However, employing known techniques to manufacture containers with deep protrusions has various problems. One such problem is the orientation of the plastic material around the deep protrusion. Orientation refers to how closely the molecules in a plastic material are packed together. Orientation of plastic molecules occurs as the plastic material stretches, and the greater the material stretch, the higher the orientation. As the orientation of the plastic molecules increases, the molecules straighten and may form a crystalline structure. Typically, the higher the crystallinity of the plastic, the greater the rigidity of the plastic, which improves the structural integrity of the container. The structural integrity of the container may be important during hot fill processing as the container must be able to withstand the rigors of hot fill processing.

In a hot fill process, a product is added to the container at an elevated temperature, about 82° C., which can be near the glass transition temperature of the plastic material, and the container is capped. During hot fill processing and in the subsequent cooling, the container base may experience roll out, distortion, or deformation that can cause the container to lean or become unstable. This problem can be reduced or eliminated by increasing orientation of material in the container base.

During blow molding of a container, gas is forced into a parison which causes the parison to inflate and stretch to take the shape of the container mold. However, the parison cools as it contacts the container mold. Cooling of the parison affects its ability to stretch, and thus its ability to orient.

While this may not cause problems for most sections of the container, it particularly affects the orientation of the material formed around a deep protrusion. As the parison contacts the deep protrusion, the parison must flow around the protrusion into a recess. As the parison contacts the protrusion and cools, the parison is less able to flow around the protrusion, which affects the ability of the parison to stretch and to orient plastic material at the recess. Insufficient orientation at a region, such as at a base or at a hand grip, may affect the ability of the region to maintain its shape around the protrusion, the strength of the region, or the ability of the container to stand on a flat surface. Cooling of the parison also is known to create thick amorphous plastic sections around the protrusion, which adds excess plastic material to the container and affects the rigidity around the protrusion. The thick amorphous plastic sections add to the weight of the container, and thus the cost.

A known system for manufacturing a blow molded container is described in U.S. Pat. No. 5,255,889 to Collette et al., which is incorporated herein by reference. In the system described therein, a preform is received and enclosed by a mold chamber, which includes two side movable mold members and a base mold. In the mold chamber, the base mold member has an upper base plug with a protrusion that extends upward toward the center of the mold chamber. During blow molding, gas is forced into the preform to inflate and stretch the preform material into the shape of the mold chamber. As the preform material reaches the protrusion, the material stretches around the protrusion into a recess to form a bearing surface of the container. Once the container is formed, the mold chamber (the two side mold members and the base mold member) opens and releases the molded container. However, the base of the containers generated by this system may have limited crystallinity, a build up of amorphous unoriented material, or other problems in the base similar to those described above due to forcing the preform to stretch around the protrusion into the recess to form the bearing surface of the container.

Likewise, FIG. 10 illustrates a base assembly 100 for forming a container base according to the prior art. The base assembly 100 includes a base pedestal 102, a centering pin 120, and a base plug 104, with the base plug 104 being secured to a top surface of the base pedestal 102. The centering pin 120 may be used to secure and position the base assembly in a blow molding apparatus (not shown). The base plug 104 includes a base mold 106 for forming a container base. The base mold 106 includes a protrusion 108 for forming a deep protrusion in the container base, and a surface 110 for forming a bearing surface of the container base.

During blow molding of a parison into a container, the base mold 106 forms the parison material into a base of the container. As the parison material contacts the base mold 106, the parison material stretches around the protrusion 108 down to the surface 110 for forming the bearing surface, as indicated by the arrows A and B. However, once the parison contacts the protrusion 108, the parison material begins to cool and the orientation of the parison material is slowed, which causes the formation of thick amorphous plastic sections in the base. The thick amorphous plastic sections affect the rigidity of the base, the ability of the container to stand on a flat surface, and add to the cost of the container.

What is needed is an improved system for forming a deep protrusion in a container that overcomes the shortcomings of conventional solutions.

BRIEF SUMMARY OF THE INVENTION

One aspect of the invention is to create a deep-set grip in a container that provides secure grippability along with a good ergonomic feel in the resultant container. In a preferred embodiment, the deep-set grip is achieved in a manner to maintain the overall container weight at an as minimal a weight as possible, and to allow for a wide range of design applications.

The invention includes a container forming assembly including a mold having a sidewall with a recess, and a method for making the container.

A method according to exemplary embodiments of the invention includes receiving a parison, enclosing the parison within a mold having a wall with a recess, inflating the parison into the mold to form a blow molded container where the blow molded container has a sidewall, a movable region formed at the recess that extends outward from the container, and a hinge circumscribing an interface between the sidewall and the movable region, and moving the movable region about the hinge before filling the blow molded container with liquid or other consumable product.

A container forming assembly according to an exemplary embodiment of the invention forms a container from a parison where the container has at least one movable gripping region. The container forming assembly includes a mold adapted to form a first portion and a second portion of the at least one movable gripping region wherein the first portion is rotatable about a first hinge toward an interior of the container, the first hinge being formed at a first seam between the first portion and the container, and said second portion is rotatable about a second hinge toward the interior of the container, the second hinge being formed at a second seam between the second portion and the container; and a drive mechanism adapted to move the mold to enclose the parison during blow molding and to release the container after blow molding.

Another exemplary method according to the invention is directed to a method for increasing crystallinity of a blow molded container. This exemplary method includes inflating a parison in a mold having a wall with a recess to form a blow molded container having a movable gripping region, the movable gripping region being formed at the recess, the blow molded container having a hinge coupled to said movable gripping region, the hinge circumscribing an interface between the blow molded container and the movable gripping region; and moving the movable gripping region about said hinge toward an interior of said blow molded container before filling the blow molded container.

The container forming assembly according to another exemplary embodiment would include a first mold half forming a first movable gripping region and a second mold half forming a second movable gripping region where the second movable gripping region has hinges, rotatable portions and the structure of the first movable gripping region.

In the exemplary embodiment, each of the first and second mold halves have a recess forming a movable gripping portion forming region that includes a first surface adapted to form a first outer grip portion of the movable gripping region, a second surface adapted to form a second outer grip portion of the movable gripping region, a third surface adapted to form a first inner grip portion of the movable gripping region, a fourth surface adapted to form a second inner grip portion of the movable grip portion; and a fifth surface area adapted to form a ridge area of the movable gripping portion.

The container forming assembly of the foregoing exemplary embodiment may further have its fifth surface area positioned between the third and fourth surfaces, and wherein the third and fourth surfaces positioned adjacent to the first and second surfaces, respectively.

The invention also includes a method for forming a container, a method for increasing crystallinity of a container, a base assembly for forming a container, and a container.

The method of the invention for forming a container includes receiving a parison, enclosing the parison with a mold having a cavity, inflating the parison in the mold to form a blow molded container with a moveable region at the cavity, and repositioning the moveable region before filling said blow molded container.

The method of the invention for increasing crystallinity of a container includes inflating a parison to form a blow molded container having a moveable region, at least a portion of the moveable region protruding outward from the blow molded container, and repositioning the moveable region before filling the blow molded container.

The base assembly of the invention, which is adapted to form a container with a base having a moveable region and having a bearing surface, includes a base pedestal, a push rod coupled to the base pedestal, and a base plug coupled to the base pedestal. The base plug has a base mold adapted to form the moveable region and to from the bearing surface of the base so that at least a portion of the moveable region protrudes outward from the base beyond the bearing surface. The push rod is adapted to reposition the moveable region before filling the container.

The container of the invention includes a base having a moveable region with a dimple, and a bearing surface that is offset from the moveable region. After blow molding and before filling the container, at least a portion of the moveable region protrudes outward beyond the bearing surface.

Further advantages, as well as the structure and function of exemplary embodiments will become apparent from a consideration of the description, drawings, and examples.

BRIEF DESCRIPTION OF THE DRAWINGS

The foregoing and other features and advantages of the invention will be apparent from the following, more particular description of exemplary embodiments of the invention, as illustrated in the accompanying drawings, wherein like reference numbers may generally indicate identical, functionally similar, and/or structurally similar elements.

FIG. 1 depicts an exemplary embodiment of a first stage of a container with the deep-set grip inverted, according to the present invention;

FIG. 2 depicts a cross sectional view of the exemplary container of FIG. 1 according to the present invention;

Further objectives and advantages, as well as the structure and function of exemplary embodiments will become apparent from a consideration of the description, drawings, and examples.

DETAILED DESCRIPTION OF THE INVENTION

Exemplary embodiments of the invention are discussed in detail below. In describing the exemplary embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations may be used without parting from the spirit and scope of the invention. All references cited herein are incorporated by reference as if each had been individually incorporated.

Figure 4:
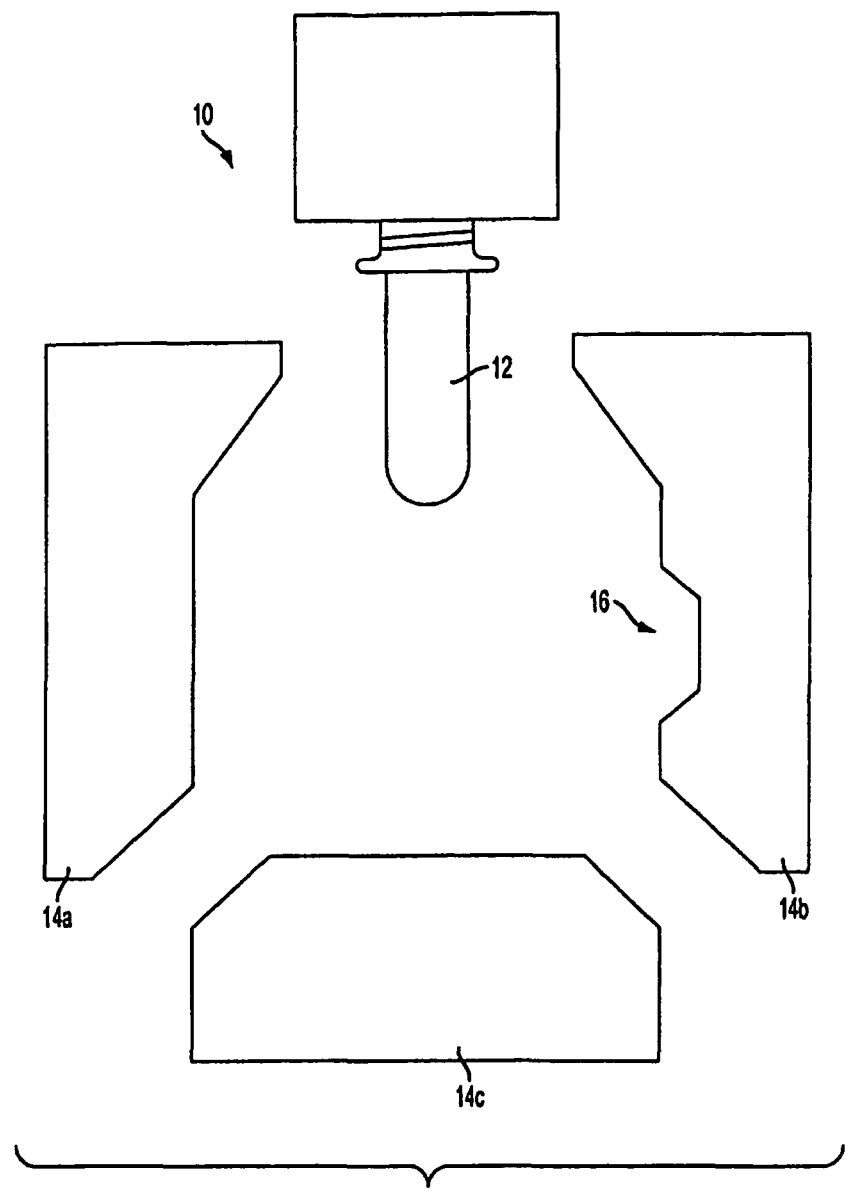
FIG. 4 illustrates a parison received before a mold according to an exemplary embodiment of the invention.

Exemplary embodiments of the present invention may generally relate to a container, a method of inverting a grip of a container, and a blow molding apparatus for forming a container having an invertible grip. In an exemplary embodiment, as shown in FIG. 4, a blow-molding apparatus 10 may receive a parison 12 and enclose the parison with a mold 14a-c, which may include a recess 16 in the outer surface of the mold 14b. The blow-molding apparatus 10 may inflate the parison into the mold to form a blow molded container 100 (see FIG. 5). The blowmolded container 100 may have a sidewall, a movable region 18 formed at the recess 16, and a hinge circumscribing an interface between the sidewall of container 100 and the movable region 18. The blow-molding apparatus may be adapted to move the movable region 18 about the hinge before filling the blow molded container 100. An internal volume of the blow molded container may be reduced by moving the movable region 18 into the center of the container 100 (arrow 22 in FIGS. 6 and 7A) as schematically shown in FIG. 7C. The movable region 18 may form a grip for the container 100. By blow molding the movable region 18 or grip in its outward position (outside the container) and then inverting the movable region to form the grip by using a simple mechanical force, the weight of the container may be reduced and the definition of the grip may be improved.

Figure 3A:
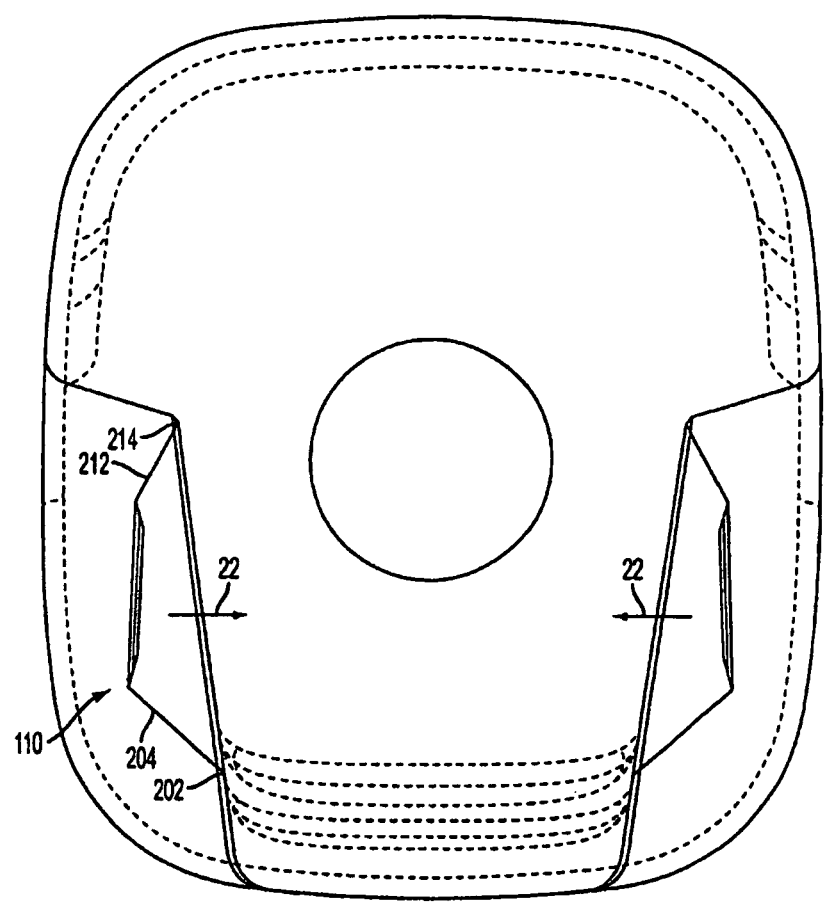
FIGS. 3A-B depict an exemplary embodiment inverting a grip of a container according to the present invention.
Figure 3B:
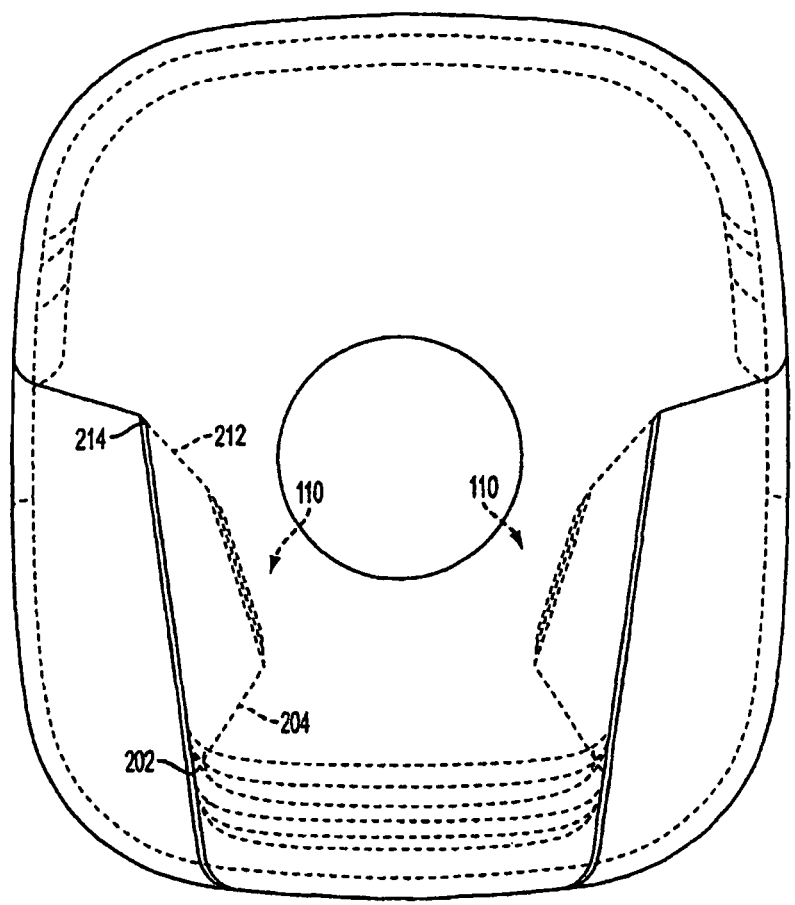

FIG. 1 illustrates an exemplary embodiment of a container representing the shape of the container as stretch blow molded according to the present invention, FIG. 2 illustrates an exemplary embodiment of a movable region of a container in its outwardly blown position according to the present invention, and FIGS. 3A-B illustrate an exemplary embodiment of the movable region of a container in its outwardly blown position and the final configuration of the grip according to the present invention, respectively.

Figure 7A:
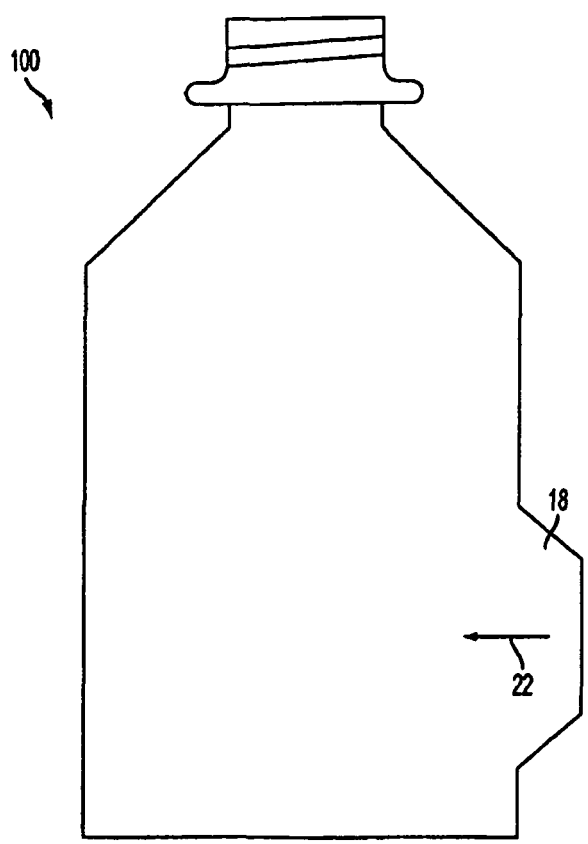
FIGS. 7A-C schematically illustrate the movable region of the exemplary container being inverted after release from the mold.
Figure 7B:
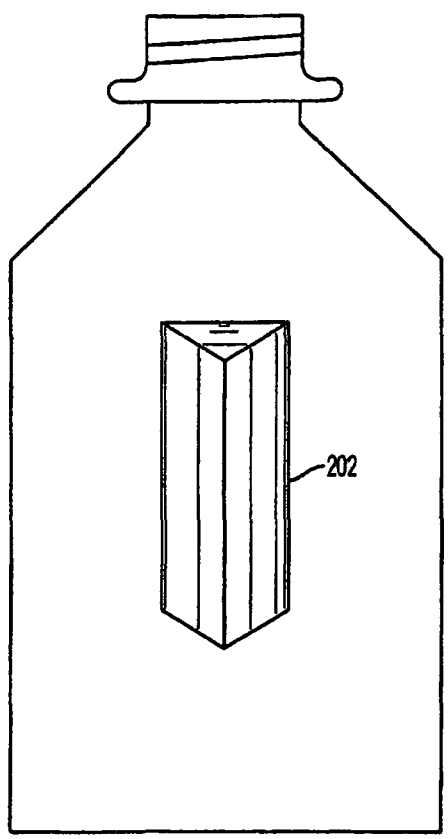

The exemplary embodiments will initially be discussed with reference to FIGS. 1-2. According to an exemplary embodiment of the present invention, container 100 is blow molded into the shape as schematically illustrated in FIG. 7. FIG. 1 illustrates a perspective side view of the exemplary container 100 according to an exemplary embodiment of the present invention. As depicted, the container 100 includes an upper portion 102, a shoulder 104, a container body 106, and a base 108. The upper portion 102 of the container 100 generally is any structure having an opening into the interior of the container 100 and being adapted to receive a closure (not shown). The closure may be any device used to create a substantially air tight seal for a hot-filled product within the container 100, thus substantially preventing air from entering the container 100 through the upper portion 102. In one exemplary embodiment, the upper portion 102 includes threads 112 that are adapted to couple with a closure that is a twist-on cap. The cap may be twisted onto the threads 112 of the upper portion 102 to create a seal with the container 100. In an alternative embodiment, a sealing plug may be placed in the upper portion 102 to seal the container 100. Other closures or seals may be used, as will be appreciated by those of skill in the art.

The shoulder 1.04 of the container 100 extends from the top of the container body i 06 to the bottom of the upper portion 102. Generally, the shoulder 104 narrows as it progresses from the container body 106 to the bottom of the upper portion 102. The shoulder 104 may have any desired shape, or may be omitted from the container 100. The shoulder 104 may' include patterns, shapes, and other geometries, or alternatively, may be substantially smooth. In the depicted embodiment, the width of the bottom of the shoulder 104 corresponds to the width of the top of the container body 106, and narrows by curving inward as the shoulder 104 approaches the upper portion 102. The shoulder 104 curves outward before reaching the upper portion 102, and then curves inward as the shoulder 104 reaches the upper portion 102. The shoulder 104 may be other shapes and include other patterns, as will be appreciated by those of skill in the art.

The container body 106 of the container 100 extends from the base 108 to the shoulder 104 and defines an interior of the container 100. The container body 106 is positioned below the shoulder 104. In an alternative embodiment, if the shoulder 104 is omitted from the container 100, the container body 106 extends to the upper portion 102. The container body 106 may be any asymmetrical or symmetrical shape, such as, but not limited to, cylindrical, square, rectangular, or other geometries. Optionally, the container body 106 of the container 100 may include patterned support structure or vacuum panels. The patterned support structure and the vacuum panels may help provide structural integrity for the container 100.

In the depicted embodiment, the container body 106 has ribs 112 positioned at various locations on the container 100. The ribs 112 may be a series of recessed sections alternating with non-recessed sections on the container body 106. The ribs 112 may include other types and shapes and may also be placed at alternate locations on the container body 106, as will be appreciated by those of skill in the art. The ribs 112 may also be omitted from the container body 106, or may be placed at other locations on the container 100.

Figure 6:
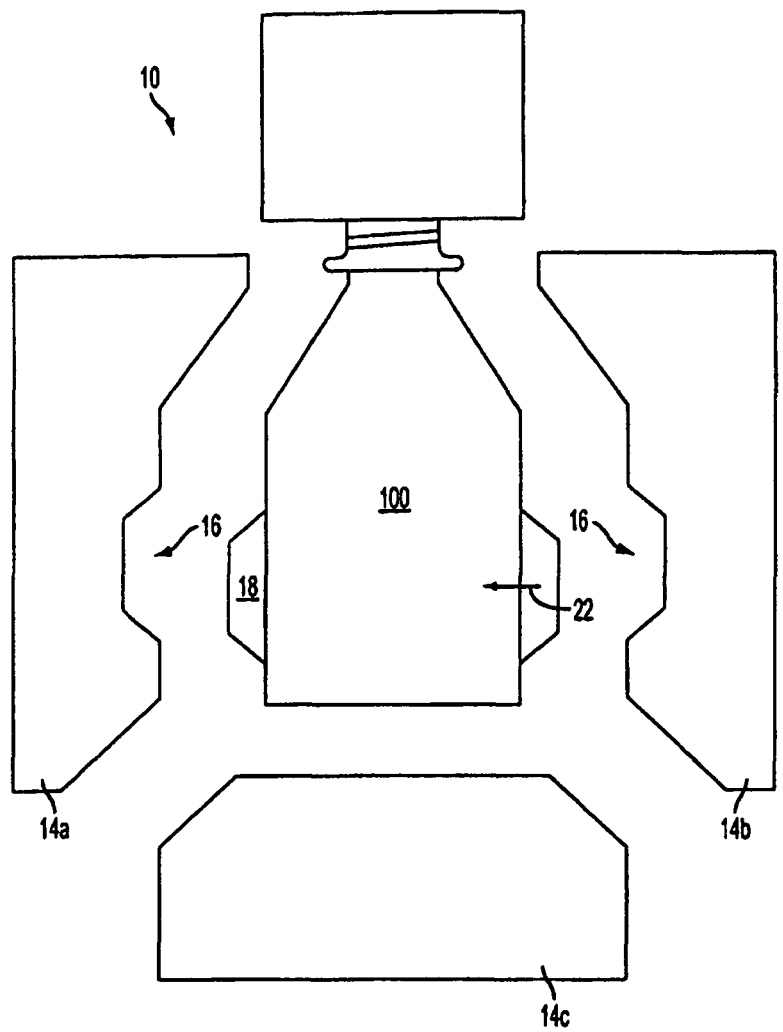
FIG. 6 schematically illustrates another exemplary blow molded container with a movable region being inverted prior to release from the mold-on each side of the container.
Figure 7C:
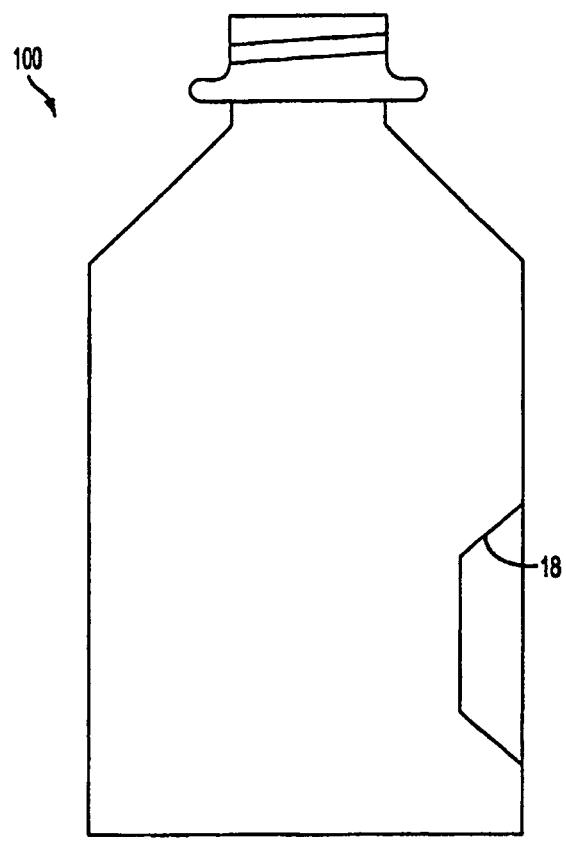

The container body 106 may also include a movable region 110 that initially is blow molded outside of the container 100 (see FIG. 6). The movable region 110 is comprised of a number of surfaces in the grip area of the container body 106. The number of surfaces are arranged in a way so that an external force (arrow 22) acting on the grip area causes the surfaces to fold in relation to one another until such a point where they snap into an inverted position toward the interior of the container 100. As depicted in FIG. 2, the movable region 110 may include a first hinge or seam 202, a first portion 204, a first inner wall 206, a second hinge or seam 214, a second portion 212, a second inner wall 210, a third hinge or seam 208, a fourth hinge or seam 216, and a fifth hinge or seam 218. The first hinge or seam 202 couples the first portion 204 so that portion 204 of the container body 106 is initially blow molded outside the container body 106 and then can be pushed inside the container as shown in FIGS. 3A-B, respectively. The second hinge or seam 214 couples the second portion 212 so that second portion 212 can be pushed inside the container 106 by pivoting about second hinge or seam 214. The fifth hinge or seam 218 couples the first portion 204 with the first inner wall 206, and the fourth hinge or seam 216 couples the second portion 212 with the second inner wall 210 so that these portions can be pushed inside container 106. The inverted movable region 110 is shown in FIG. 3B.

Figure 5:
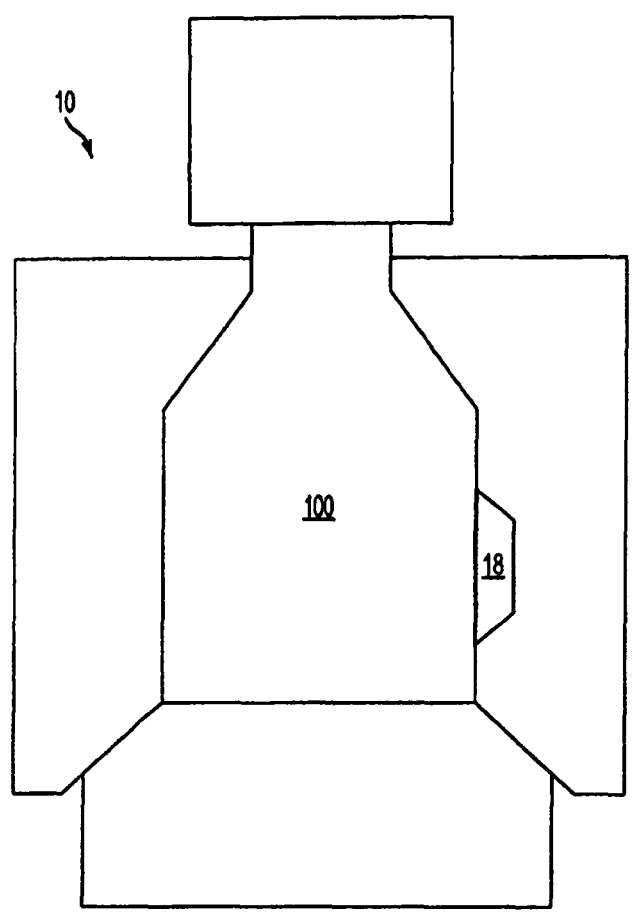
FIG. 5 schematically illustrates an exemplary blow molded container with a movable region according to the invention.

The mold of the container forming assembly shown in FIGS. 4-6 may be made of first and second mold halves 14a, 14b that each may include a wall with a recess to form respective first and second movable gripping regions 110. The gripping-regions 110 are initially blown outside the container and then inverted so that a consumer's hand easily fits into the inverted gripping regions.

Initially, when the container 100 is blow molded, the movable region 110 is formed extending away from the interior of the container 100. FIG. 3A illustrates the movable region 110 as blow molded extending away from the interior of the container 100, and FIG. 3B illustrates the movable region 110 extending toward the interior of the container 100 after inversion. During inversion, a force may be applied to cause the movable region 110 to invert. As the –force is applied, the first portion 204 rotates about the first hinge or seam 202 and the second portion 212 rotates about the second hinge or seam 214. Additionally, the first portion 204 rotates about the fifth hinge or seam 218 relative to the first inner wall 206, the second portion 212 rotates about the fourth hinge or seam 216 relative to the second inner wall 210, and the first inner wall 206 rotates about the third hinge or seam 208 relative to the second inner wall 210. That is, a many sided movable region 110 is initially blown outside the container thereby avoiding the need for a mold with a deep-set protrusion around which plastic material has difficulty forming the desired thickness about the protrusion. Then, the weights of the plastic at the hinges or seams along with the angles of the first and second portions and the inner walls are designed so that movable region 110 can be inverted into the container to form a deep-set grip(s) that a consumer can securely grip and that has a good ergonomic feel to the consumer. The container wall thickness at the hinges is thinner than the surrounding portions or inner walls, which are heavier as the plastic naturally moves in this manner. The angles of the first and second portions and the inner walls should be sufficiently steep so that the desired depth of a grip is achieved and the desired ergonomic feel.

During inversion, a sufficient force may be applied to the movable region 110 formed outside the container while the container 100 remains within the mold 14a-c (see FIG. 5). As the Assignee of the present invention has successfully inverted projections blown outside the base of the container, enough force needs to be applied to the movable region 110 to cause inversion. In one embodiment, the inversion of the moveable region 18 (110 in FIGS. 1-3B) may occur as late into the blowing process as possible so that the container 100 is allowed to cool as much possible before the container 100 is released or ejected from the mold. The longer the container and movable region can cool, a better inversion result can be achieved. This is because the warmer the container is during inversion, the higher the probability that the container will crease at an undesired location resulting in an aesthetically unpleasing container and thus, a rejected container. The inversion may occur just before the container is ejected or released from the mold to reduce the likelihood that the inversion will form unwanted creases or deformities in the container 100. An air cylinder (not shown) may be used for the inversion of the movable region 110 by applying a force to the first portion 204 and to second inner wall 210. Alternatively, other mechanical, pneumatic, hydraulic, or cam operated means for inverting may be used, as will be appreciated by those skilled in the art. For example, the cam operated means may be included within the mold and the movable region may be inverted while the mold fully encloses the formed container.

The container 100 is blow molded into the shape depicted in FIG. 3A to avoid trapping material in recessed areas of a complex shaped mold and to improve the performance (less rejected containers) of the container 100 at the movable region 110 without increasing the amount of material to the region. The movable region 110 is formed into the shape shown in FIG. 3A to ensure that all surfaces of the movable region are properly formed with sufficient amounts of material and have sufficient definition. An advantage of forming the movable region 110 extending away from the interior of the container is that the rigidity at the movable region 110 is increased by allowing for further orientation of plastic material during the blow molding process (see FIGS. 1, 2, and 3A), as compared with initially forming the container with a deep-set protrusion extending toward the interior of the container (see FIG. 3B). By having the movable region 110 extend away from the interior of the container 100, the orientation of plastic material in the movable region 110 is increased since the mold would not trap material, but would allow the plastic material to further stretch into a cavity of a mold to form the movable region 110 during blow molding. As the orientation of the plastic molecules increases, the molecules straighten and may form a crystalline structure. Typically, the higher the crystallinity of the plastic, the greater the rigidity of the plastic, which improves the structural integrity of the container 100 at the movable region 110. A similar process for increasing orientation is also described in co-pending U.S. Provisional Utility Patent Application No. 60/671,459, filed Apr. 15, 2005, the contents of which are incorporated herein by reference in their entirety.

It is noted that if the container 100 would be initially blow molded into the shape depicted in FIG. 3B, the movable region 110 would not be fully formed at the region near the first hinge or seam 202 and near the second hinge or seam 212. This is the result of forming a container with the stretch blow molding technique. As a container is being stretch blow molded, gas stretches plastic material against a mold for the container, such as a mold for the container 100. If the mold contains a protrusion to form the movable region depicted in FIG. 3B, the plastic material would have to stretch around the protrusion from third hinge or seam 208 down to the region near the first hinge or, seam 202 and near the second hinge' or seam 212 (see FIG. 3B). The contact with the mold would trap material at the region near the third hinge or seam 208, and not allow the material to fully form down into the region near the first hinge or seam 202 and near the second hinge or seam 212. Moreover, forming the movable region 110 with such a protrusion would cause plastic to become trapped at the movable region 110, which may prevent other areas of the container to not have sufficient plastic to properly form those areas.

Stretch blow molding the container 100 into the shape as illustrated in FIGS. 1, 2, and 3B also reduces the wall thickness of the movable region 110 and reduces the occurrence of thick amorphous plastic sections near the movable region 110, as compared with forming the container with the movable region 110 extending outwardly from the container as depicted in FIG. 3A. This may allow the amount of plastic material present in the movable region 110 to be reduced without detrimentally affecting container performance, and, in some instances, this technique improves the performance of the movable region. Likewise, forming the container into the shape as illustrated in FIG. 3A may allow a more uniform distribution of plastic material in the base 108. Moreover, the increased rigidity may allow for the inversion of the movable region 110 without a substantial net distortion of the container body 106.

Figure 8:
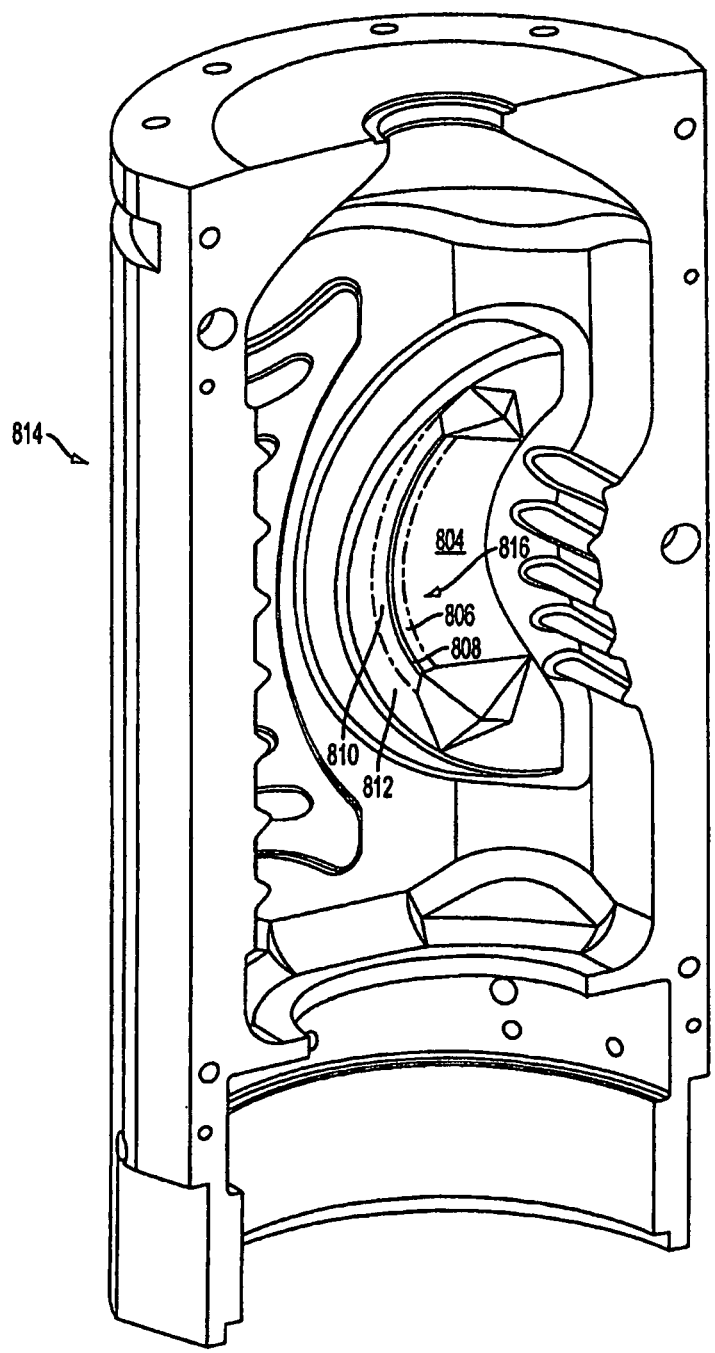
FIG. 8 illustrates a mold for forming half of the container shown in FIG. 1.
Figure 9:
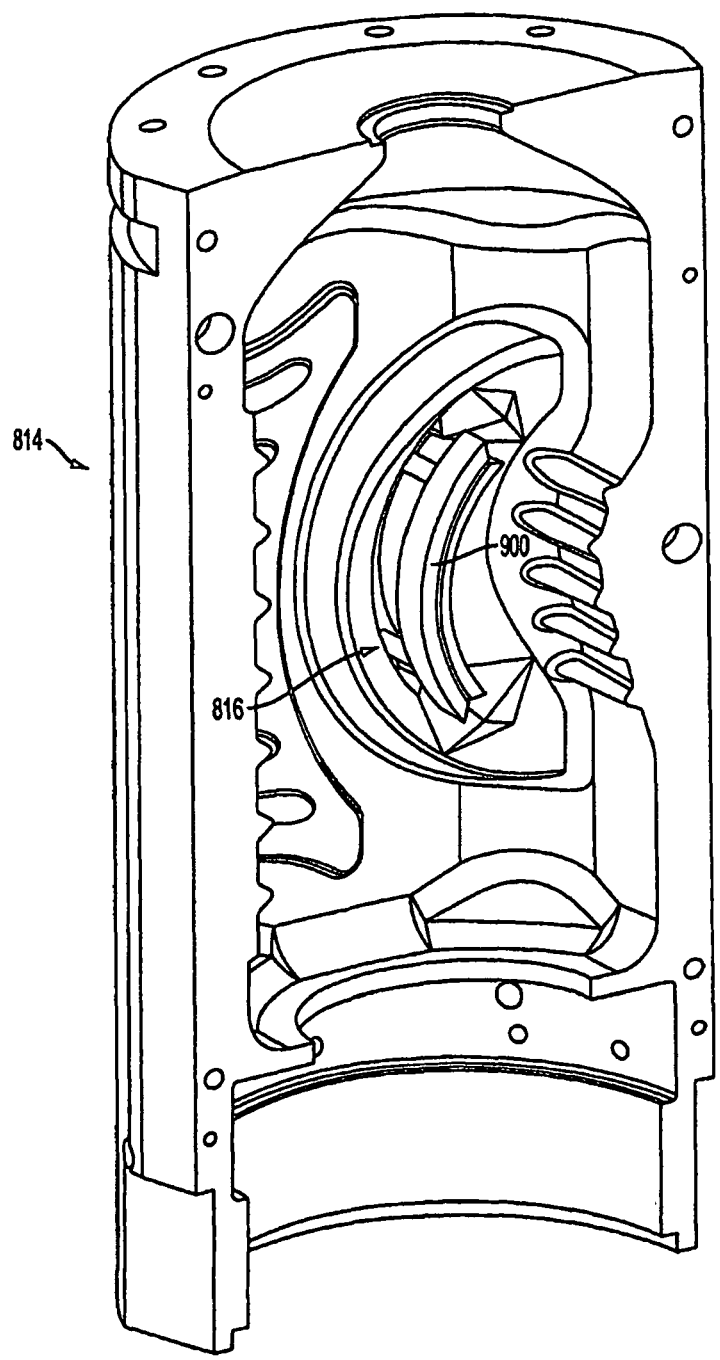
FIG. 9 shows an embodiment of the mold that can be activated to push in an outwardly protruding region toward the center of the container.
Figure 10:
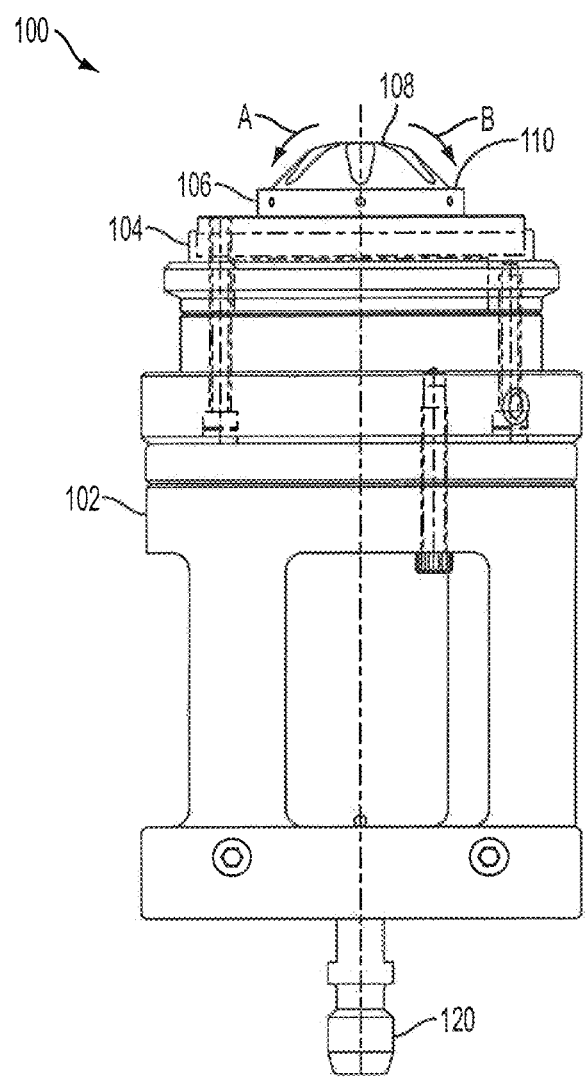
FIG. 10 illustrates a base assembly for forming a container base according to the prior art.

FIGS. 4-6 schematically illustrate a container forming assembly for forming a container from a parison according to one embodiment of the invention. The assembly includes a mold 14a, 14b, and 14c that can be driven by a drive mechanism to enclose parison 12. A container 100 is blown within the closed mold assembly, as shown in FIG. 5. A recess 16 may be disposed in a sidewall of mold 14a and mold 14b to form a two sided grip for a container. FIG. 8 illustrates one side of the mold 814 for forming a container as shown in FIG. 1. In this embodiment each side mold would include a recess 816 that has a first surface 804 adapted to form a first outer grip portion (204), a second surface 812 adapted to form a second outer grip portion (212), a third surface 806 adapted to form a first inner grip portion (206) adjacent the first outer grip portion (204), a fourth surface 810 adapted to form a second inner grip portion (210), and a fifth surface area 808 adapted to from a ridge area (208) of a movable gripping region 110. The forming assembly may include a first push rod adapted to rotate the first portion 204 of a movable region 110 about first hinge or seam 202 to invert the movable region so that it forms a gripping region. A second push rod may be employed to cause the second portion 212 to rotate about hinge or seam 214 to push both sides of the resultant gripping regions within container 100 prior to filling the container with food product. As shown in FIG. 9, a section 900 of the recess 816 that corresponds with surfaces 806 and 810 and surface area 808 is movable between the inactive position shown in FIG. 8 and the active position shown in FIG. 9.

This system also benefits from requiring less expensive components. While other systems may use complex pneumatic, hydraulic, or cam operated means to push pieces of the mold inward at a specific point in the blow molding cycle, the exemplary embodiments may use a simple mechanical means of inverting the movable region 110. This reduces the cost, molding time, and complexity of the mold set up as compared with conventional systems.

Thus, the container 100 according to exemplary embodiments of the present invention may improve the sufficient rigidity, definition, and performance of the container 100 at a movable region 110 thereby allowing a container to be formed that uses less plastic while maintaining the performance and appearance of the container.

The embodiments and examples discussed herein are non-limiting examples. The shape of the inset are not limited to the examples shown, as the movable region may blown outward in a round or oval forum and, when inverted, still obtain the same function—decrease the volume of the blown container.

Figure 11A:
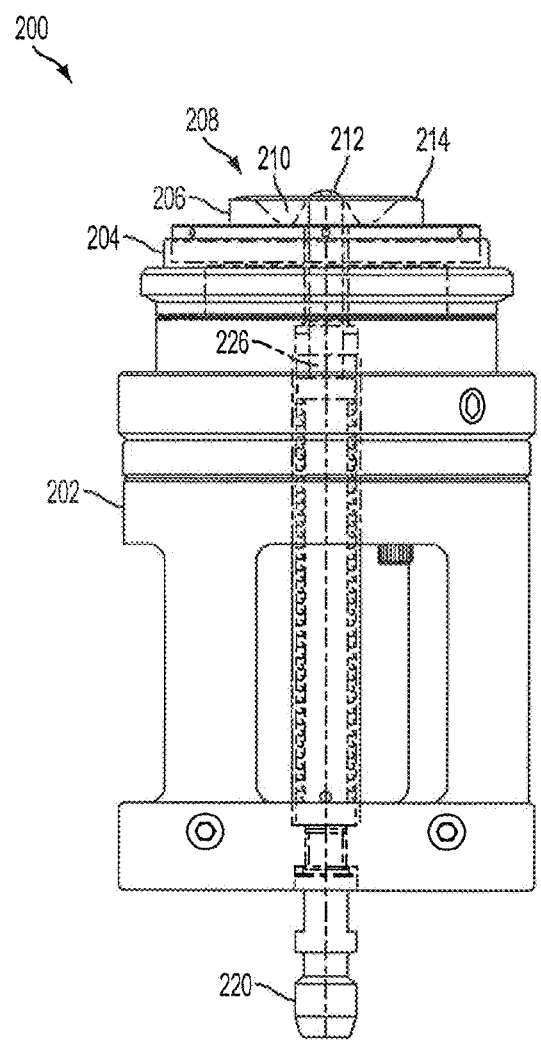
FIGS. 11A-11D illustrate an exemplary embodiment of a base assembly according to the present invention.
Figure 11B:
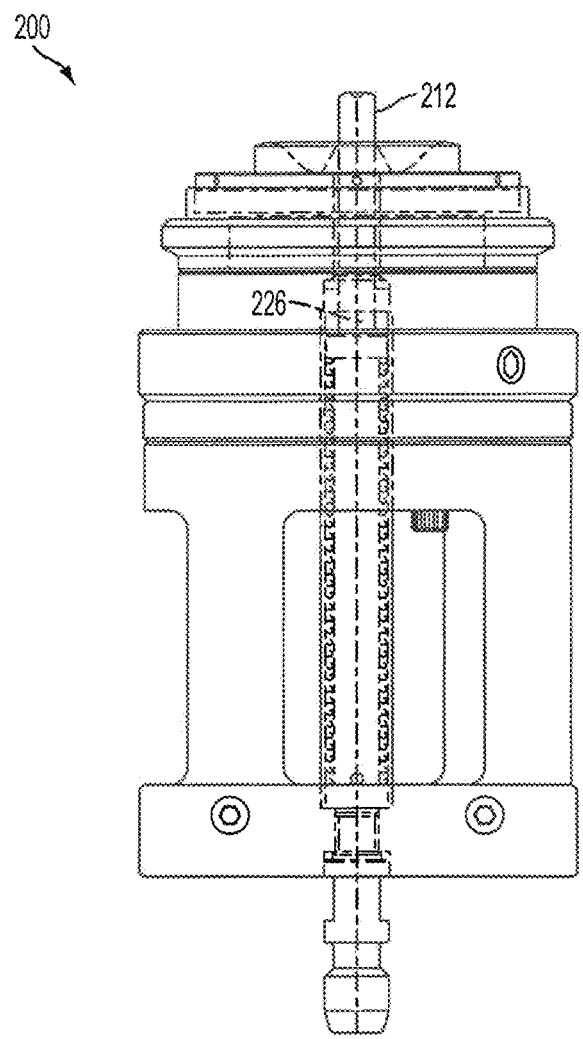
Figure 11C:
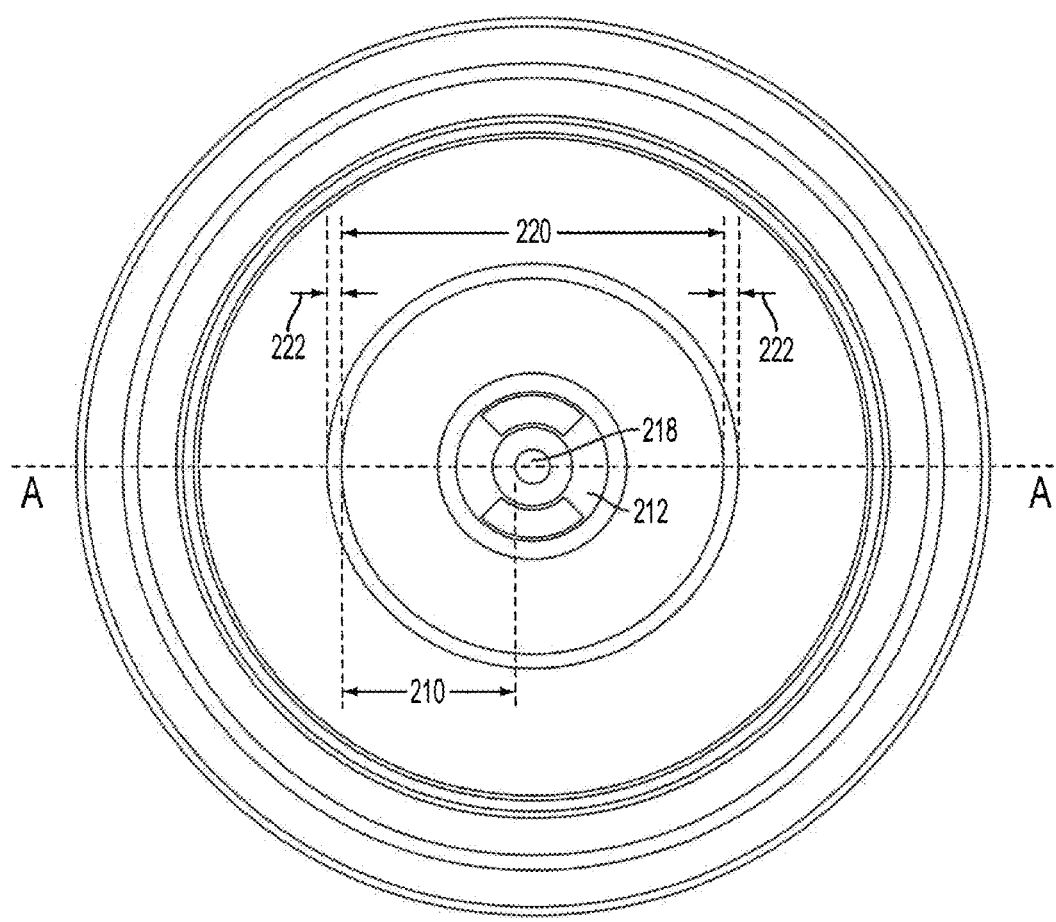
Figure 11D:
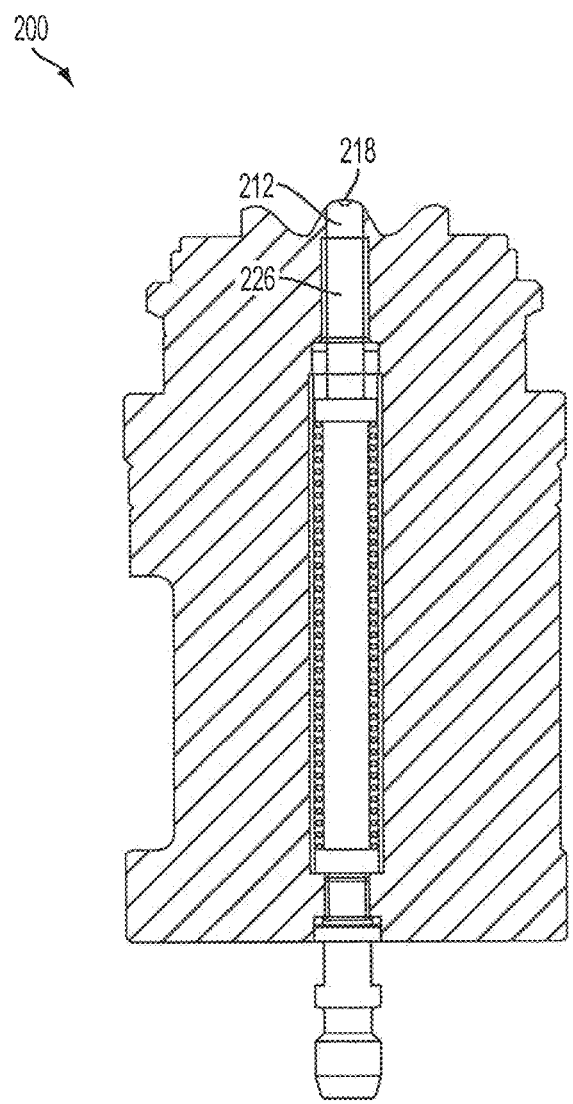

Furthermore, FIGS. 11A-11D illustrate an exemplary embodiment of a base assembly 200 according to the present invention. FIG. 11A illustrates a side view of the base assembly 200 having a push rod 226. FIG. 11B illustrates a side view of the base assembly 200 with a rod end 212 of the push rod 226 extended. FIG. 11C illustrates a top view of the base assembly 200. FIG. 11D illustrates a cross sectional view of the base assembly 200 along line A-A of FIG. 11C to further depict the push rod 226. In the following description, reference to FIGS. 11A-11D will be made.

The base assembly 200 includes a base pedestal 202, a base plug 204, a centering pin 220, and a push rod 226. The centering pin 220 may be used to secure and position the base assembly 200 in a blow molding apparatus (not shown). The base pedestal 202 may have any shape, so long as it has a hollow central region for receiving the push rod 226, and a top region adapted to connect with the base plug 204. In an alternative embodiment, the base plug 204 and the base pedestal 202 may be a single apparatus. During blow molding, the base assembly 200 is raised to connect with other mold assemblies for blow molding of a container. After the container is blow molded, the base assembly 200 is lowered to release the container.

The push rod 226 is a cylindrically shaped rod that is located above the centering pin 220 and extends through the base pedestal 202 up to a surface of the base plug 204. In one embodiment, the push rod 226 is a metal mold component. The base assembly 200 includes a mechanism that moves the push rod 226 and elevates a rod end 212 of the push rod 226 above the surface of the base plug 204. In an alternative embodiment, only the rod end 212 of the push rod 226 may be elevated. The mechanism for elevating the push rod 226 may be a spring, a cam, or may be driven pneumatically, hydraulically, or electronically. The mechanism may be located internal or external to the push rod 226. The rod end 212 is formed at the end of the push rod 226, and the top surface of the rod end 212 is used to form a dimple in the base of the container. The shape of the rod end 212 is similar to a truncated cone, where the end of the truncated cone includes a section 218. The section 218 of the rod end 212 may be concave, and the section 218 may be adapted to form a convex section in the base of the container that extends downward away from the center of the container. In alternative embodiments, the section 218 of the rod end 212 may be flat or convex extending upward toward the center of the container. The section 218 is used to reposition a moveable region of the base from an initially outward protruding position to a position within the container cavity, as will be discussed later in detail.

The base plug 204 includes a base mold 206 having a contact surface 208 adapted to contact a parison material during blow molding of a container. The contact surface 208 of the base mold 206 forms the shape of the base of the container. The contact surface 208 is a curvilinear mold for forming a moveable region and a bearing surface of a container base. As will be described later in detail, once the base of the bottle is formed, the moveable region of the base is repositioned from an outwardly protruding position toward the interior of the container. In one embodiment, the movable region is repositioned to a position within the interior of the container, thus forming a container base that is structurally and functionally similar to that of a container having a conventional push up.

The contact surface 208 includes a cavity 210, a surface 214, and a surface of the rod end 212. The surface of the cavity 210 and the surface of the rod end 212 form an inner region 220 of the base mold 206, and the surface 214 forms an outer region 222 of the base mold 206, with the outer region 222 being offset from the inner region 220. The inner region 220 and the outer region 222 are adapted to form a base of a container during blow molding. The outer region 222 is substantially flat and is adapted to form a bearing surface of a container. In an alternative embodiment, the outer region 222 may be non-flat or rounded, or may form a discontinuous bearing surface. The present invention can thus be adapted to form bearing surfaces with geometries known in the art.

When viewing a side cross section of the mold 206, the cavity 210 is a depression in the base mold 206 that is adapted to form a moveable region in a container. The cavity 210 begins at the outermost edge of the inner region 220, and curves both inward toward the center of the base mold 206 and downward toward the bottom of the base assembly 200. Prior to reaching the rod end 212, the cavity 210 reaches its bottom and begins to curve upward. From the bottom of the cavity 210, the cavity 210 curves both inward toward the center of the base mold 206 and upward away from the bottom of the base assembly 200. The cavity 210 ends at the truncated end of the rod end 212. In an alternative embodiment, the bottom of the rod end 212 may occur at other locations in the base mold 206 relative to the rod end 212, or may even be positioned on the rod end 212. When the base mold 206 is viewed from the top, the cavity 210 is a circular depression in the base mold 206 (see FIG. 11C). The cavity 210 is located between the outermost edge of the inner region 220 and the outermost edge of section 218 of the rod end 212. In an alternative embodiment, the cavity 210 may be any symmetric or asymmetric shape other than a circular depression. For example, the cavity may form a triangle, a rectangle, or a polygon. In a further alternative embodiment, the cavity 210 does not curve upward from its bottom, and instead may curve further downward or may be flat until it reaches the center of the base mold 206.

Figure 12A:
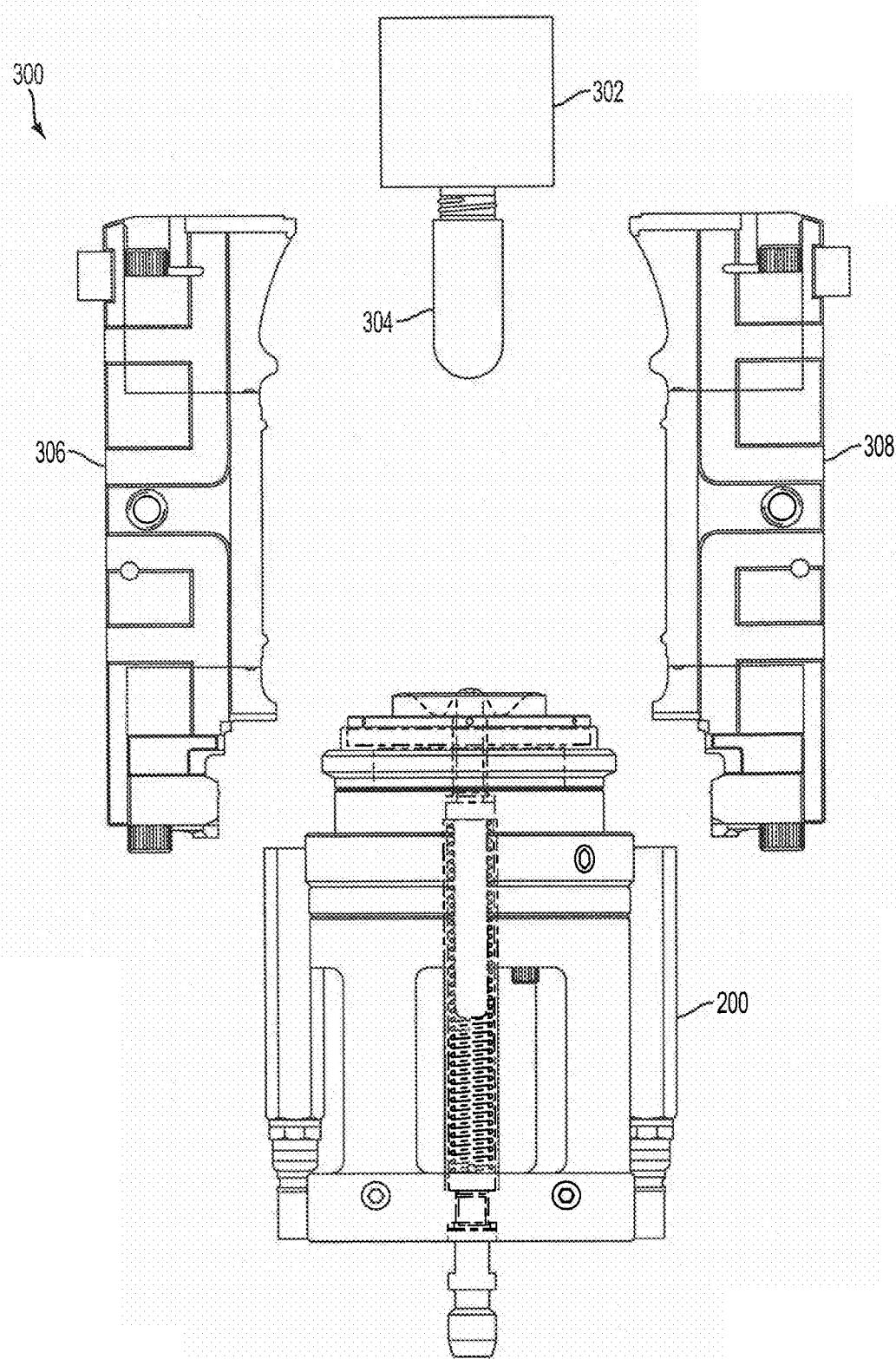
FIGS. 12A-12B illustrate an exemplary embodiment of using a base assembly to form a container base according to the present invention.
Figure 12B:
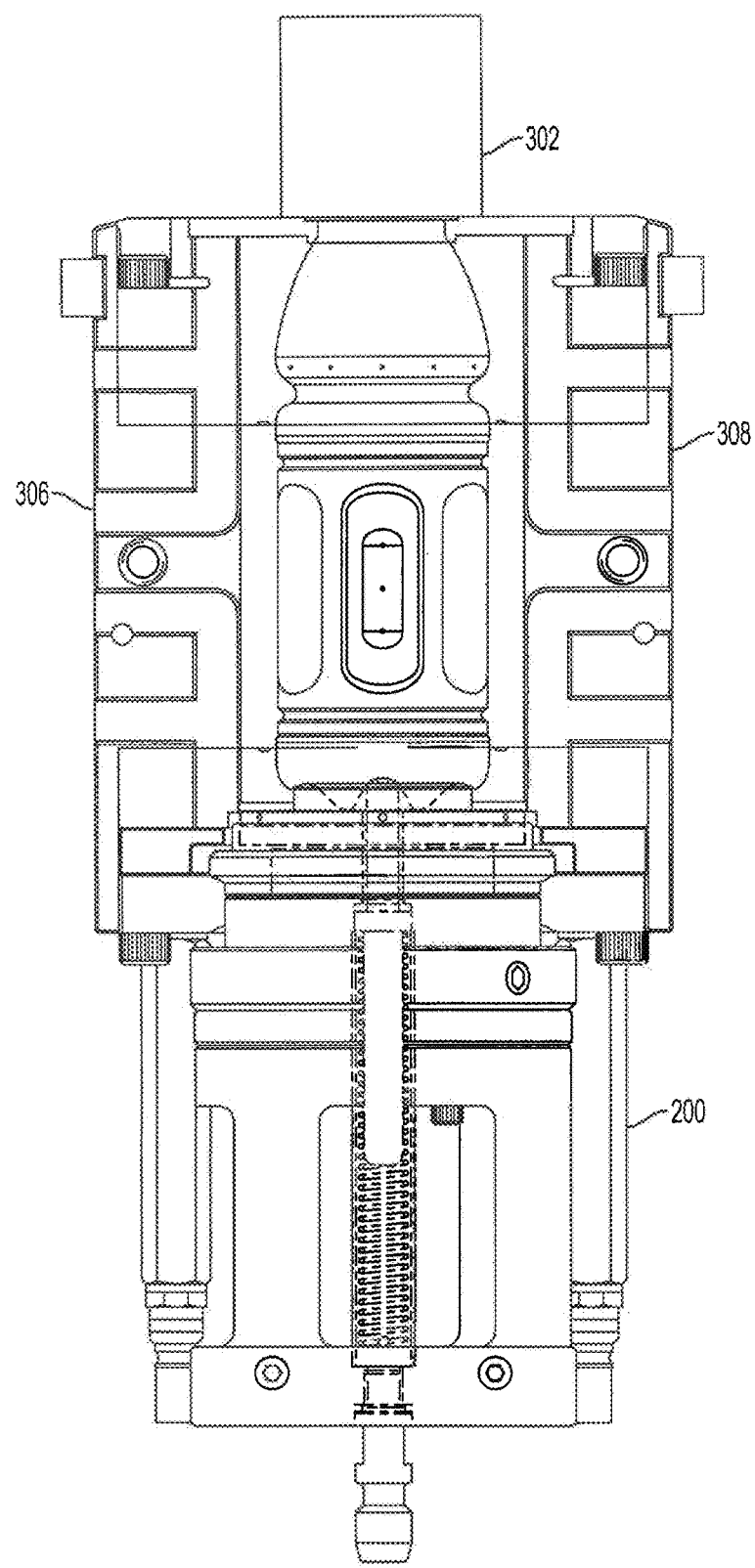

FIGS. 12A-12B illustrate an exemplary embodiment using a base assembly 200 to form a base of a container according to the present invention. In FIG. 12A, a parison 304 having a threaded finish is attached to a holder 302 of a blow molding apparatus (not shown) that is adapted to form a blow molded container. Surrounding the parison 304 is a first side mold 306, a second side mold 308, and the base assembly 200. The first side mold 306 contains a mold of one side of the container, and the second side mold 308 contains a mold of the other side. The first side mold 306 and the second side mold 308 may be mirror images of one another, or they may have different shapes. Other combinations and different numbers of molds may be used, as is understood by those of skill in the art.

Prior to blow molding, the parison 304 is enclosed by the first side mold 306, the second side mold 308, and the base mold 206. As illustrated in FIG. 12B, once the parison is enclosed, gas is forced into the parison 304 to inflate the parison 304 in the first side mold 306, the second side mold 308, and the base mold 206. During inflation, the parison 304 stretches into the form of the first side mold 306, the second side mold 308, and the base mold 206. As the parison material contacts the base mold 206, the parison material is blown against the contact surface 208 into the cavity 210. The parison material stretches into the cavity 210 to form a moveable region in the base of the container.

By having the cavity 210 in the base mold 206, the parison material does not encounter a deep protrusion, which would cause cooling and would reduce plastic material orientation. Stretching the parison material during inflation into the cavity 210, as opposed to around a protrusion, allows the parison material to further stretch and orient since the parison material is blown into a wider space as compared with a narrow recess around a deep protrusion. The additional stretch increases the crystallinity of the molecules of the parison material, which increases the rigidity of the base and improves the structural integrity of the base. Blow molding the parison material into the cavity 210 also reduces the wall thickness of the base and reduces the occurrence of thick amorphous plastic sections in the base. Thus, the amount of plastic material present in the base can be reduced without detrimentally affecting container performance, and, in some instances, this technique improves the performance of the base.

Figure 13A:
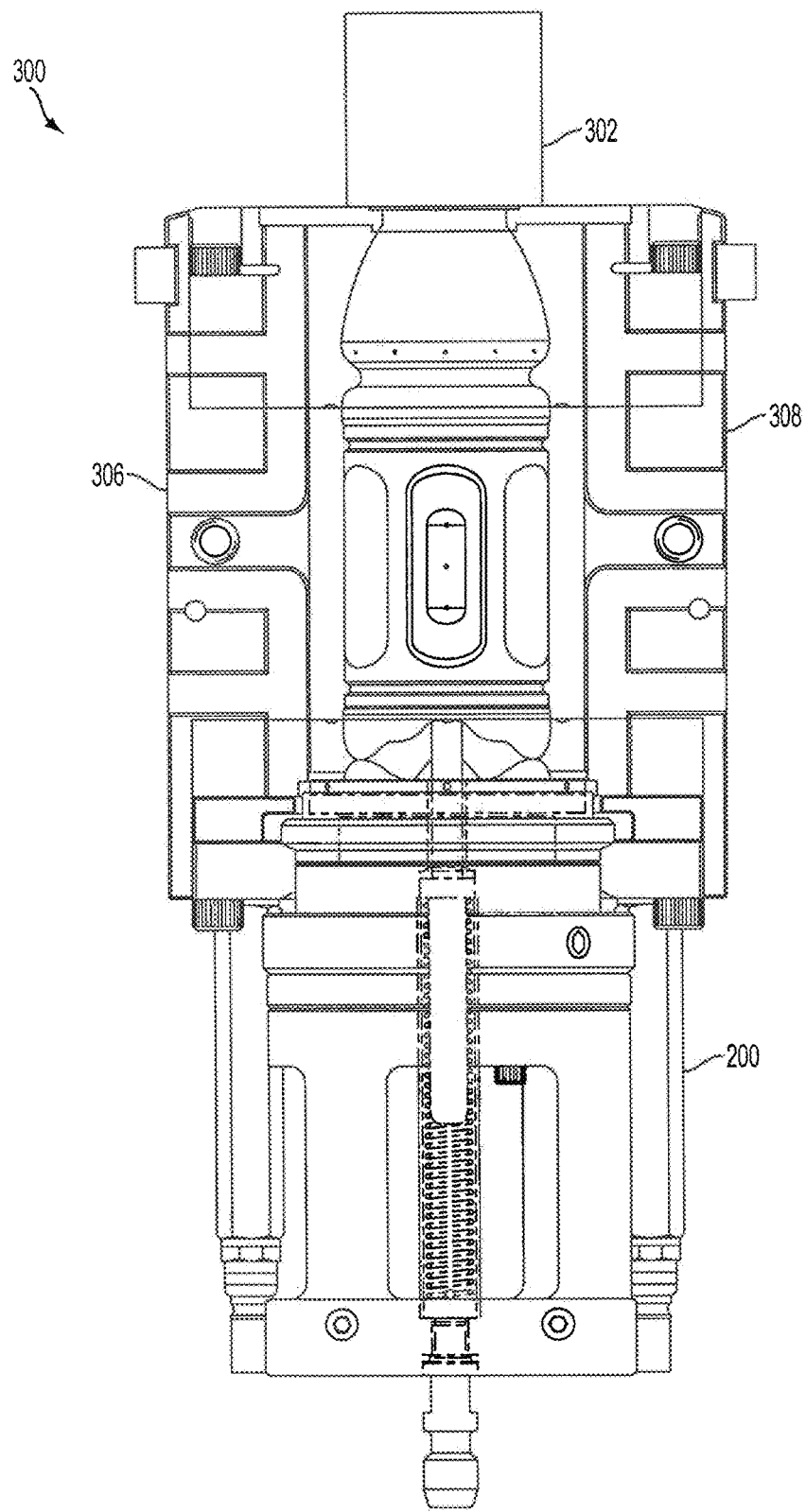
FIGS. 13A-13B illustrate exemplary embodiments of a push rod repositioning the container base according to the present invention.

FIG. 13A illustrates an exemplary embodiment of the push rod 226 repositioning the base of the container according to the present invention. In this embodiment, prior to separating the first side mold 306, the second side mold 308, and the base assembly 200 from the container, the base of the container is repositioned. After the inflation process of the parison 304 has completed, a base having a moveable region that protrudes outward from the container is formed at the cavity 210. The moveable region of the container base is downwardly convex with respect to a bearing surface, as is described below in detail. The push rod 226 is then elevated upward toward the center of the container to elevate the rod end 212 above the contact surface 208 to exert pressure on the moveable region of the base. As the rod end 212 is further elevated, the moveable region is forced upward toward the center of the container into an upward position, which extends inward into the interior of the container with respect to the bearing surface. After the moveable region is repositioned upward, the push rod 226 may be lowered. Thereafter, the first side mold 306, the second side mold 308, and the base assembly 200 may release the blow molded container by separating.

Figure 13B:
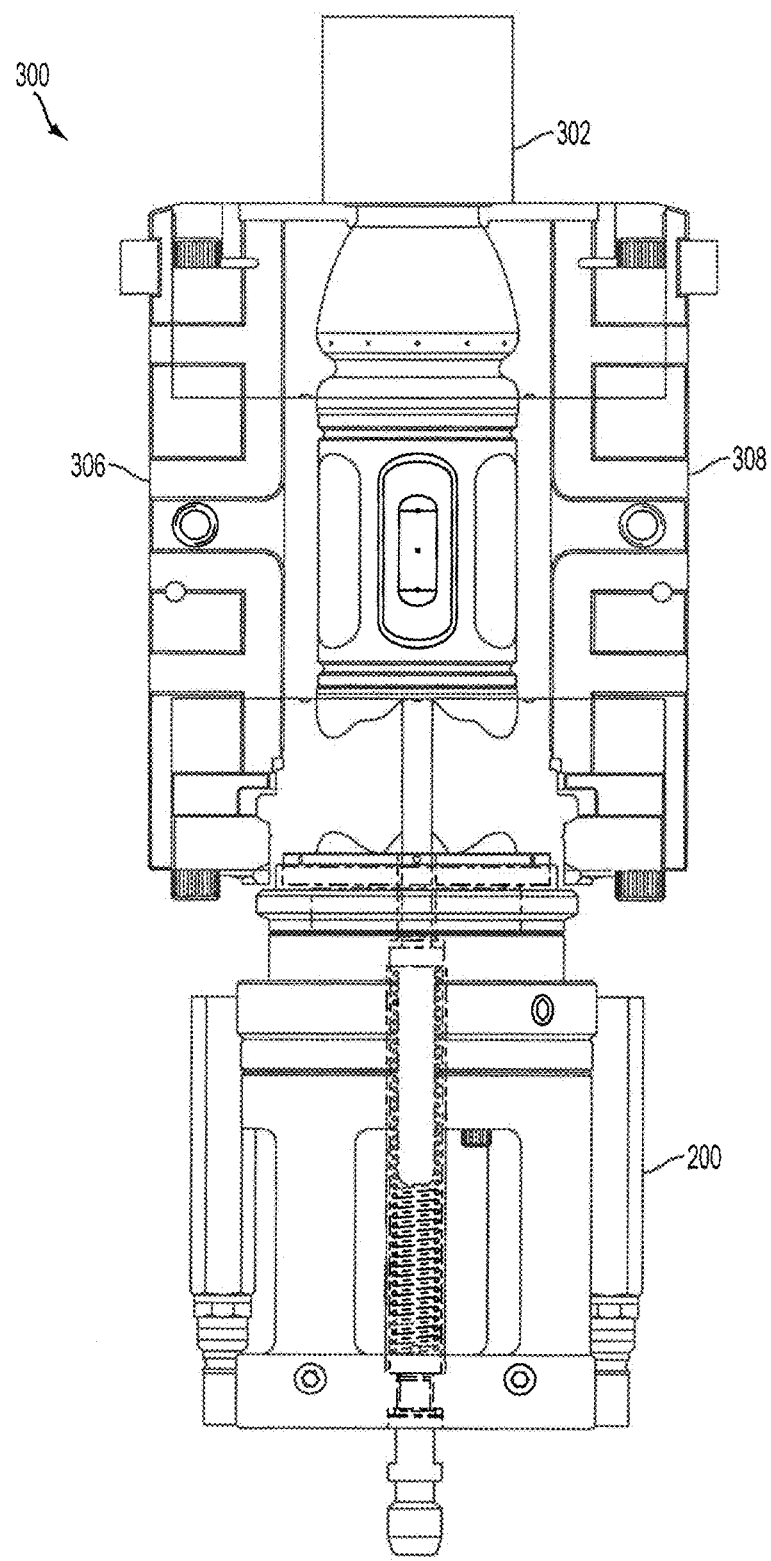

FIG. 13B illustrates an alternative exemplary embodiment of the push rod 226 repositioning the base of the container according to the present invention. In this embodiment, the base assembly 200 separates from the first side mold 306 and the second side mold 308 to release the base of the container. Afterwards, the rod end 212 is elevated until it reaches the moveable region of the container base. The rod end 212 then exerts pressure on the base of the container to reposition the moveable region of the base. Thereafter, the first side mold 306 and the second side mold 308 may release the blow molded container by separating so that the container may be further processed. In still other embodiments, the base of the container may be released from the molds without being repositioned and sent to a different device for repositioning the moveable region.

Figure 14A:
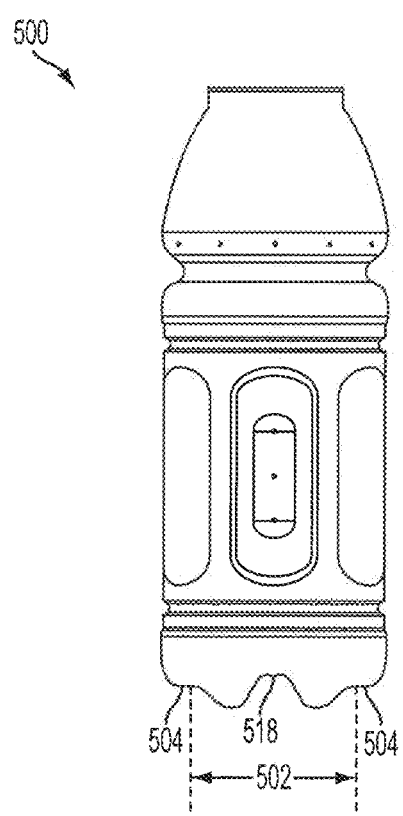
FIGS. 14A-14B illustrate an exemplary embodiment of a container prior to and after repositioning according to the present invention.
Figure 14B:
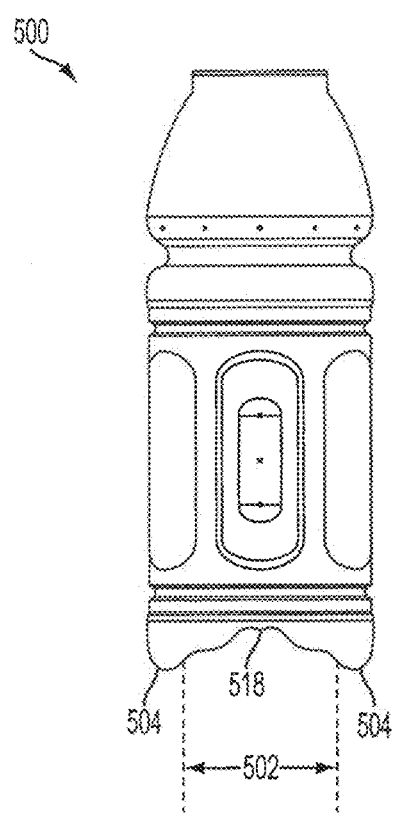

FIGS. 14A and 14B illustrate an exemplary embodiment of a container 500 prior to and after repositioning by the push rod 206 according to the present invention. Prior to repositioning, the base includes a moveable region 502 and a bearing surface 504, where at least a portion of the moveable region 502 protrudes outward from the base of the container beyond the bearing surface 504. The moveable region 502 of the container base is downwardly convex with respect to the bearing surface 504. During inflation using base mold 206, the moveable region 502 is formed by the inner region 220 of the base mold 206, and the bearing surface 504 is formed by the outer region 222. The moveable region 502 protrudes outward from an innermost edge of the bearing surface 504 away from the center of the container and is downwardly convex with respect to the bearing surface 504. The moveable region 502 is illustrated as being circular, but may be any symmetrical or asymmetrical shape. A dimple 518 is formed at a center of the moveable region 502 by the surface of the rod end 212 of the contact surface 208. The dimple 518 is upwardly convex and protrudes inward toward the center of the container 500. The dimple 518 provides a pocket in which the rod end 212 can be situated as the push rod 226 extends to reposition the moveable region 502 of the base.

During repositioning, the moveable region 502 is moved toward the center interior of the container by the extension of the rod end 212. In one embodiment, the moveable region 502 is moved within the interior of the container with respect to the bearing surface 504. In repositioning, the rod end 212 contacts the dimple 518 and forces the dimple 518 toward the center of the container. This repositions the moveable region 502 and causes the moveable region 502 to no longer extend or protrude beyond the bearing surface 504. In an alternative embodiment, the rod end 212 may contact the moveable region 502 at other locations to reposition the moveable region 502 of the base, as would be understood by those of ordinary skill in the art. In one embodiment, repositioning of the base occurs before the container is filled so that the container may be placed on a substantially flat surface for transport to, for example, a filling machine, or alternatively, for transport during manufacturing or for palletizing, as is known in the art. The filling machine may fill the container by any known filling process, including hot filling, cold filling, and other filling processes known by those skilled in the art. By repositioning the moveable region 502, the container can stand stably on a substantially flat surface and be processed similar to containers with conventionally manufactured push up bases. Thus, the base region, after repositioning the moveable region 502, has the appearance and functionality of a conventional blow molded base with a push up, without the disadvantages of the prior art.

The container 500 has a one-piece construction and can be prepared from a monolayer plastic material, such as a polyamide, for example, nylon; a polyolefin such as polyethylene, for example, low density polyethylene (LDPE) or high density polyethylene (HDPE), or polypropylene; a polyester, for example polyethylene terephthalate (PET), polyethylene naphtalate (PEN); or others, which can also include additives to vary the physical or chemical properties of the material. For example, some plastic resins can be modified to improve the oxygen permeability. Alternatively, the container 500 can be prepared from a multilayer plastic material. The layers can be any plastic material, including virgin, recycled and reground material, and can include plastics or other materials with additives to improve physical properties of the container. In addition to the above-mentioned materials, other materials often used in multilayer plastic containers include, for example, ethylvinyl alcohol (EVOH) and tie layers or binders to hold together materials that are subject to delamination when used in adjacent layers. A coating may be applied over the monolayer or multilayer material, for example to introduce oxygen barrier properties.

Although the present embodiment and the figures illustrated the parison 304 as a preform having threads at the top, the parison may also be a threadless plastic tube without departing from the scope of the invention. One example using a parison that is a plastic tube involves inserting a needle into the parison, and forcing gas through the needle to expand the plastic tube to take the shape of a mold. Additionally, any blow molding technique may be used for forming the container, including injection blow molding, stretch blow molding, or extrusion blow molding, as would be understood by those of skill in the art.

It is noted that the detailed description describes a technique for blow molding a moveable region 502 on a container base by molding a parison material into a cavity 210. However, this technique may be used to form other regions of a container other than the base, such as to form at least a portion of a hand grip of a container, or to form other deep protrusions of a container. The cavity 210 may also be located on either side mold 306 or 308, or on other locations in the base mold 206. This technique is useable on any region of a plastic container where a deep protrusion is required. The technique described herein increases the rigidity of a region having a deep protrusion, while reducing thick amorphous plastic sections around the region caused by the deep protrusion.

The exemplary embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described exemplary embodiments of the invention maybe modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A plastic container having an as-molded configuration and a final configuration, the plastic container in the as-molded configuration comprising:
    a cylindrical body defining a longitudinal axis and having an upper portion, a sidewall portion, and a base portion, the base portion having, in the as-molded configuration:
    a bearing surface having a bearing wall thickness;
    a downwardly-convex moveable region extending outwardly below the bearing surface in the as-molded configuration, the moveable region configured to be repositioned inwardly about an annular structure at an interface between the bearing surface and the moveable region from the outwardly-extending as-molded configuration to the final configuration extending inwardly above the bearing surface,
    wherein the annular structure has a maximum wall thickness less than the bearing wall thickness of the bearing surface in the as-molded configuration.

2. The plastic container of claim 1, wherein the annular structure is discontinuous around the base portion.

3. The plastic container of claim 1, wherein the annular structure is segmented around the base portion.

4. The plastic container of claim 1, wherein the plastic container is composed of polyethylene terephthalate (PET).

5. The plastic container of claim 1, wherein the upper portion includes a polyethylene terephthalate (PET) blown finish.

6. The plastic container of claim 1, wherein the base portion is configured to be physically acted on by a base forming assembly having a movable insert portion.

7. The plastic container of claim 1, wherein the annular structure separates the movable region of the base from a non-movable portion of the base.

8. The plastic container of claim 1, wherein the moveable region is convex in shape.

9. The plastic container of claim 1, the moveable region having a movable region wall thickness surrounding the annular structure, wherein the annular structure has a maximum wall thickness less than the movable region wall thickness.

10. A plastic container having an as-molded configuration and a final configuration, the plastic container in the final configuration comprising:
    a cylindrical body defining a longitudinal axis and an interior space and having an upper portion, a sidewall portion, and a base portion;
    the base portion having:
    a bearing surface having a bearing wall thickness;
    an annular structure adjacent to and disposed closer to the longitudinal axis than the bearing surface, the annular structure having a maximum wall thickness less than the bearing wall thickness of the bearing surface; and
    a convex moveable region adjacent to and disposed closer to the longitudinal axis than the annular structure, the convex moveable region configured to be repositioned about the annular structure from the as-molded configuration extending outwardly below the bearing surface to the final configuration extending upwardly above the bearing surface into the interior space defined by the cylindrical body.

11. The plastic container of claim 10, wherein the annular structure is discontinuous around the base portion.

12. The plastic container of claim 10, wherein the annular structure is segmented around the base portion.

13. The plastic container of claim 10, wherein the plastic container is composed of polyethylene terephthalate (PET).

14. The plastic container of claim 10, wherein the upper portion includes a polyethylene terephthalate (PET) blown finish.

15. The plastic container of claim 10, wherein the convex moveable region is repositionable from the as-molded configuration to the final configuration by a base forming assembly having a movable insert portion.

16. The plastic container of claim 10, wherein the annular structure defines a hinge between the bearing surface and the convex moveable region.

17. The plastic container of claim 10, the moveable region having a movable region wall thickness surrounding the annular structure, wherein the annular structure has a maximum wall thickness less than the movable region wall thickness.

* * * * *